United States Patent [19]

Sekimoto et al.

[11] Patent Number: 5,548,417
[45] Date of Patent: Aug. 20, 1996

[54] FACSIMILE APPARATUS INCLUDING A SUPPORTING FRAME MEMBER AND IMAGE HOLDING MEMBER AND IMAGE HOLDING MEMBER FORMED AS A DETACHABLE UNIT

[75] Inventors: Takashi Sekimoto; Yoichi Endo; Hirohiko Yamazaki; Masahiko Yamazaki; Yutaka Ohtani; Takeyoshi Iguchi; Kenji Matsumoto; Hiroyuki Yamazaki; Ryo Takimura; Takao Tsuda, all of Tokyo, Japan

[73] Assignee: Konica Corporation, Japan

[21] Appl. No.: 275,961

[22] Filed: Jul. 15, 1994

[30] Foreign Application Priority Data

Jul. 16, 1993 [JP] Japan .................................. 5-198922

[51] Int. Cl.⁶ .................................................. H04N 1/04
[52] U.S. Cl. ................................. 385/474; 358/494/498
[58] Field of Search .......................... 358/400, 474, 358/494, 496–498; 355/311, 318, 48–51; 271/34, 162–164; H04N 1/00, 1/04

[56] References Cited

U.S. PATENT DOCUMENTS

| | | |
|---|---|---|
| 4,707,113 | 11/1987 | Shirbrot et al. |
| 4,774,542 | 9/1988 | Kondo . |
| 4,864,411 | 9/1989 | Hale et al. ........................ 358/494 |
| 4,908,711 | 3/1990 | Majima et al. . |
| 4,924,319 | 5/1990 | Ogino et al. ...................... 358/494 |
| 5,181,129 | 1/1991 | Sato et al. ........................ 358/474 |

*Primary Examiner*—Kim Yen Vu
*Attorney, Agent, or Firm*—Jordan B. Bierman; Bierman and Muserlian

[57] ABSTRACT

A facsimile machine for transmitting an image. The facsimile machine includes: an endless-belt shape writing member on which the image is to be written; a writing frame for exposing a portion of said writing member to outside of the facsimile machine; a conveyer for conveying the image holding member for at least a size of the writing frame at one time; an optical reader for reading the image on the image holding member at the writing frame portion in which the reading generates image signals corresponding the image; a transmitting circuit for transmitting the image signals to a transmission address; and a receiving circuit for receiving information signals from other facsimile machine.

8 Claims, 29 Drawing Sheets

43

350
360

FACSIMILE APPARATUS INCLUDING A SUPPORTING FRAME MEMBER AND IMAGE HOLDING MEMBER AND IMAGE HOLDING MEMBER FORMED AS A DETACHABLE UNIT

BACKGROUND OF THE INVENTION

The present invention relates to a facsimile apparatus which reads and transmits information written on a sheet on which information can be repeatedly written. The present invention further relates to a facsimile system which can transmit and receive information to and from other facsimile apparatus without using a cord.

Recently, office automation has progressed greatly, and accordingly, facsimile apparatus is necessary in each office as an information transmission means, and facsimile apparatus are becoming more and more popular. Further, facsimile apparatus is now used not only in offices but also in the home.

In facsimile apparatus, the following operations are carried out: character or picture information is written on a document sheet for transmission; the document sheet is placed into the facsimile apparatus, and the information is read and transmitted while the document sheet for transmission is conveyed when a transmission start button is pushed. As described above, since a new document sheet for transmission on which character or picture information is written, is used at each transmission, the amount of sheet consumed is large and its cost is increased, and also, resources are wasted because a lot of sheets are consumed, which is not preferable for environmental protection.

Further, since, in the facsimile apparatus, information is transmitted and received using telephone circuits, a long cord is necessary for connecting the facsimile apparatus to a telephone terminal depending on the locations of the facsimile apparatus, so that there is a case in which the cord is a hindrance.

SUMMARY OF THE INVENTION

In view of the foregoing, the object of the present invention is to provide a facsimile apparatus which can reduce costs and ineffective use of resources, and can contribute to environmental protection when sheets, on which information can be repeatedly written, are used, and to provide a facsimile system for which a long cord is not necessary for connecting the facsimile to telephone terminals.

In order to solve the foregoing problems, a facsimile apparatus according to the present invention, comprises: a conveyance means for conveying a sheet on which information can be repeatedly written; a reading means for reading the information written on the sheets conveyed by the conveyance means; a transmission means for transmitting the information read by the reading means; and a receiving means for receiving the information which is transmitted from other facsimile apparatus.

Further, the present invention includes an embodiment in which the facsimile apparatus comprises: a sheet which is previously prepared for the apparatus, and on which information can be repeatedly written; a conveyance means which is positioned on the sheet so that the information can be written on the sheet at the time of apparatus stand-by, and which conveys the sheet when a command for transmission is received; a reading means for reading the information written on the sheet which is being conveyed; a transmission means for transmitting the information read by the reading means; and a receiving means for receiving information transmitted from other facsimile apparatus.

The present invention includes an embodiment in which: the sheet is formed as an endless-belt having a predetermined length; only a portion of the sheet, on which information can be written, is exposed from the apparatus; a portion of the sheet on which the information has been written already is conveyed into the apparatus by the conveyance means; the information is written on the portion on which the information can be written and which is newly exposed; and the sheet can be transmitted to the same transmission address as that of the previous information, as a next page.

The present invention includes an embodiment in which: information written on a portion of the endless belt-shaped sheet is read by the reading means while that portion is being conveyed into the apparatus by the conveyance means; the read out information is stored in a memory section; and the information is transmitted after the information has been stored in the memory.

The present invention includes an embodiment in which: when a plurality of transmission messages are sent, the following processes are repeated in which the endless belt-shaped sheet is conveyed by the conveyance means and the newly written portion is exposed, and the sheet on which information has been written is conveyed into the apparatus; the reading operation by the reading means is repeated corresponding to the above-described processes; the read-out information is stored in a memory section; and after the information has been inputted into the memory section, the information is transmitted by the transmission means.

The present invention includes an embodiment in which the sheet is formed by a roll-curtain-shaped sheet having a predetermined length, and the sheet is conveyed by the conveyance means having winding shafts on its both sides.

The present invention includes an embodiment in which: a board having a size corresponding to that of the surface on which the information is written is located at a position on which information can be written repeatedly, opposing to the sheet; and the board is used as an underlay for writing.

The present invention includes an embodiment, comprising: a pen which generates an electromagnetic signal and which oozes out ink including dyes which can be visually recognized; a sheet on which a visual image is formed by adhesion of the ink, and which receives a signal outputted from the pen and can specify a receiving position corresponding to coordinates at which the pen has touched the sheet; an image output means by which the coordinates are calculated according to reception of the signal outputted from the pen, and which outputs the image information; a transmission means for transmitting the image information; and a receiving means for receiving the information sent from other facsimile apparatus.

The present invention includes an embodiment, comprising: a host apparatus which is connected to a telephone circuit; a client apparatus which transmits and receives wireless signals to and from the host apparatus; and a transmitting and receiving means for transmitting and receiving signals of the facsimile apparatus through the client apparatus.

The present invention includes an embodiment in which: the transmitting and receiving signal can be communicated using infrared rays; an infrared ray transmitting-receiving apparatus is provided at a telephone terminal in a room; and image signals are transmitted to and received from other facsimile apparatus through the infrared ray transmitting-receiving apparatus.

In the foregoing embodiments of the present invention, since a sheet on which information can be repeatedly written is used, the original information written on the sheet is erased when transmission is completed, and new information is written on the sheet. Accordingly, the sheet can be repeatedly used.

A sheet on which information can be repeatedly written is previously provided on the apparatus, and the sheet is located at a position at which the information can be written on the sheet when the sheet is ready for writing. Under the above-described condition, information is written on the sheet, and the information written on the sheet is read out and transmitted while the sheet is conveyed. The sheet on which information can be repeatedly written is assembled in the apparatus. Accordingly, for example, there is no possibility that the sheet is lost, so that this is very convenient.

The sheet has a predetermined length and is formed as an endless belt. Only a portion, on which information can be written, is exposed outside the apparatus, and information is written on that exposed portion of the sheet. When the portion on which the information has been written already is conveyed into the apparatus, the next information can be written on a newly exposed portion, on which the new information can be written, and the information written on this portion is transmitted to the same address as that of the foregoing transmitted message, as a next page.

When the portion of the endless belt-shaped sheet, on which information has been written, is conveyed into the apparatus, the information on the sheet is read while the sheet is conveyed, and the read-out information is stored in a memory section. After the information has been inputted into the memory section, the information is transmitted by a transmitting means.

When plural sheets of transmission messages are transmitted, the following processes are repeated: the endless belt-shaped sheet is conveyed and information is written on the sheet; and the sheet on which the information has been written is conveyed into the apparatus. The reading-out operation of the information which has been written on the sheet is repeatedly conducted corresponding to the above-described processes, and the read-out information is stored in the memory section. As described above, since the information is transmitted after the information has been inputted into the memory section, multiple sheets of the transmission message can be transmitted in a short period of time by the endless belt-shaped sheet.

The sheet has a predetermined length and is formed to be a roll curtain-shaped. The sheet is conveyed by a conveyance means having winding shafts on the both sides thereof, and the sheet can be simply conveyed when one winding shaft is driven.

The board is used as an underlay for writing, so that writing can be easily conducted.

In another embodiment, when the ink of the pen is adhered to the sheet, a visual image is formed. At this time, the signal outputted from the pen is received, and a receiving position corresponding to the coordinates where the pen has contacted is specified. The coordinates are calculated according to the signal received from the pen, and the image information is outputted and transmitted. Accordingly, a sheet conveyance means is not necessary, and the structure is simplified.

In another embodiment, since a facsimile apparatus is connected to the client apparatus of a host apparatus which is connected to a telephone line, and information is transmitted and received by using the client apparatus of a telephone, the facsimile apparatus can be installed at any position.

In another embodiment, since an infrared ray type transmitting and receiving apparatus is installed at a telephone terminal in a room, and information is transmitted to and received from other facsimile apparatus through the infrared ray type transmitting and receiving apparatus, cords are not necessary and the facsimile apparatus can be installed at any position.

DETAILED DESCRIPTION OF THE INVENTION

Referring to the attached drawings, a facsimile apparatus and a facsimile system according to the present invention will be described below.

Figure 1:
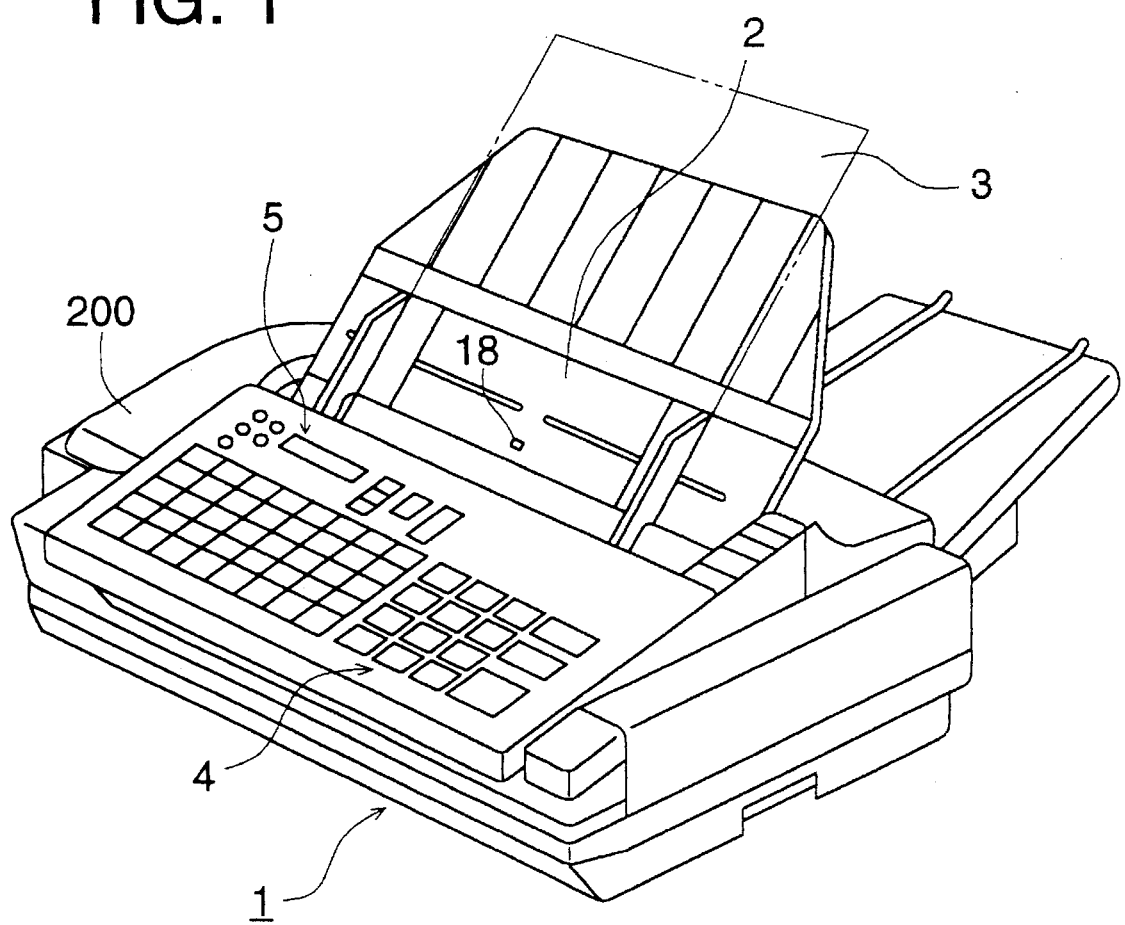
FIG. 1 is a perspective view of a facsimile apparatus.
Figure 2:
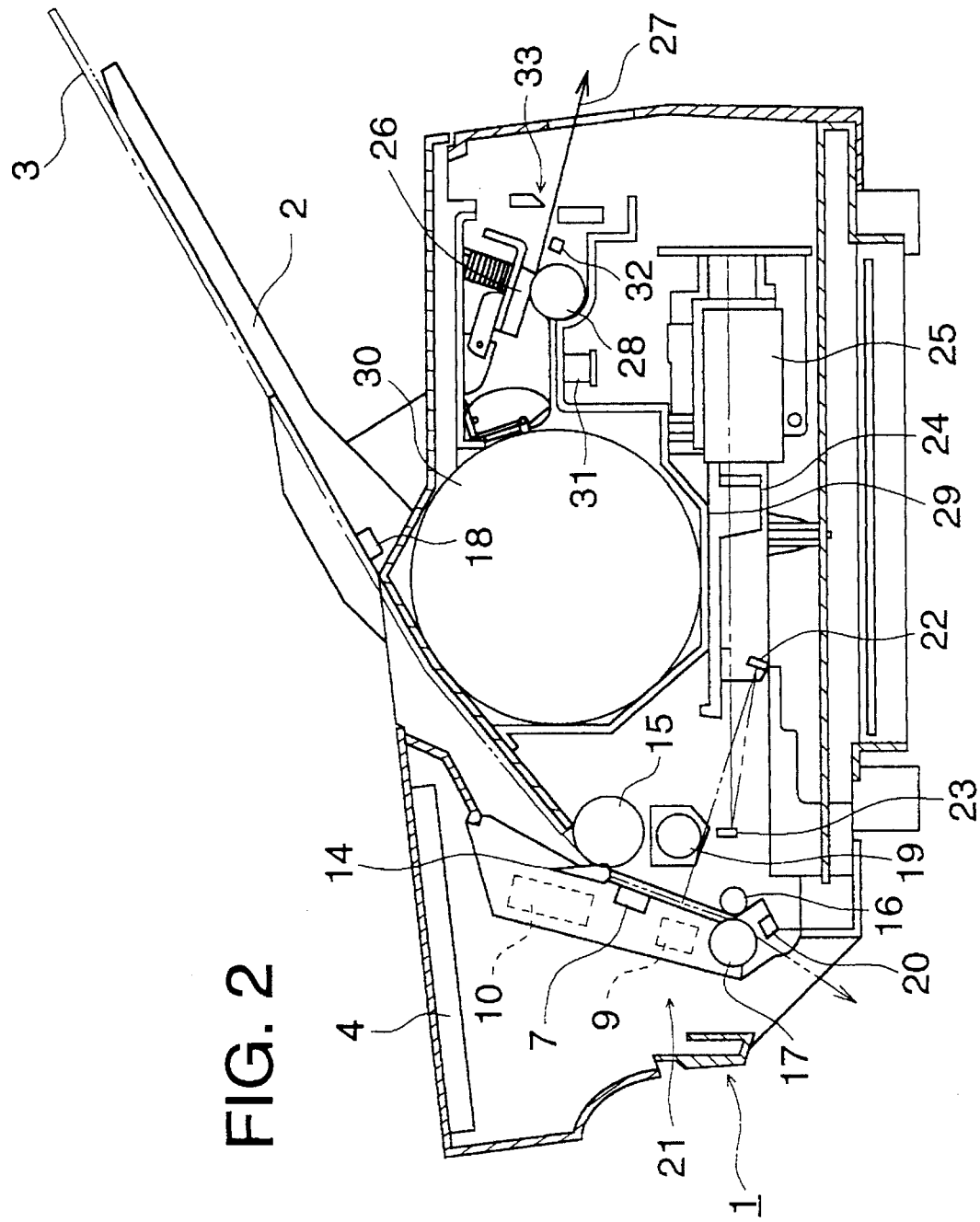
FIG. 2 is a sectional view of the facsimile apparatus.
Figure 3:
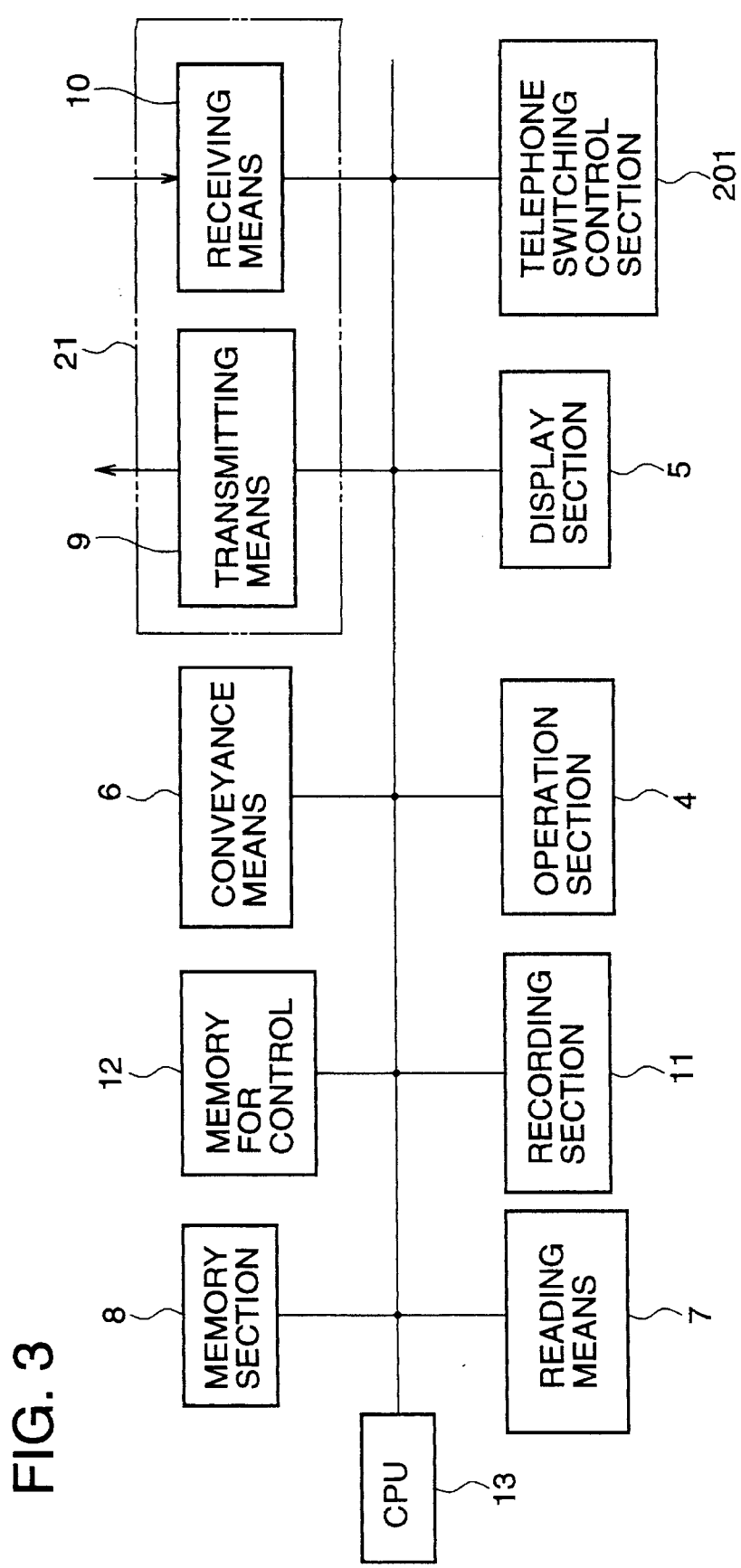
FIG. 3 is a block diagram showing an outline structure of the facsimile apparatus.

Initially, FIGS. 1 through 3 show an example of an facsimile apparatus, in which FIG. 1 shows a perspective view of the facsimile apparatus, FIG. 2 shows a sectional view of the facsimile apparatus, and FIG. 3 is a block diagram showing the outline structure of the facsimile apparatus.

In this facsimile apparatus, a platen 2 is provided on an upper portion of an apparatus main body 1. From this platen 2, a sheet 3 on which information can be repeatedly written is inserted. The sheet 3 is structured of, for example, a flexible resin sheet, or the like, and character and picture information which is written on the sheet can be easily erased when rubbed by hand, paper, or cloths. As a sheet 3 on which information can be repeatedly written, a common sheet, which can be repeatedly used, can be applied. This sheet is structured in the manner that a portion can be seen when pressure is applied on the portion, and information written on the portion is automatically erased when the pressure is released. A transmitting/receiving operation is conducted in an operation section 4. The transmitting/receiving operation and contents of a control operation are displayed in a display section 5. A receiver 200 is provided in the apparatus 1, and the apparatus can also be used as a normal telephone by using the receiver 200.

The following means are provided inside the facsimile apparatus: a conveyance means 6 for conveying the sheet 3; a reading means 7 for reading information which is written on the sheet 3 conveyed by the conveyance means 6; a memory section 8 for storing the information read by the reading means 7; a transmitting means for transmitting the information read by the reading means 9; a receiving means 10 for receiving information transmitted from other facsimiles; a recording section 11 for storing the received information and the transmitted information in a recording medium; a memory for control 12 in which a program for controlling the apparatus is stored; a CPU 13 for controlling the apparatus; and a telephone switching control section 201 which is used when the apparatus is used as a telephone.

The conveyance means 6 comprises: a double-feed-prevention mechanism 14; a supply roller 15; a feed roller 16; and a pressure roller 17. The double-feed-prevention mechanism 14 is located at an insertion portion of the platen 2 and prevents two regular transmission documents from being simultaneously conveyed. When the sheet 3 is set on the platen 2, and the document which has been set on the platen is not a regular sheet of paper but a sheet 3 which is repeatedly usable, the double-feed-prevention mechanism 14 is withdrawn from the conveyance path so that the surface of the sheet 3 is not rubbed, and so that the information which has been written on the sheet is not erased when the sheet 3 is conveyed.

The supply roller 15 is provided close to the insertion portion of the platen 2; and the feed roller 16 and pressure roller 17 are provided opposed to each other in the vicinity of a delivery portion; and the sheet 3 is conveyed by these rollers. A fluorescent lamp 19 is provided under the supply roller 15, and the start of the conveyance of the sheet 3 is indicated when the fluorescent lamp 19 is turned on. A blade 20 is located at a rear portion of the feed roller 16. After the information written on the sheet 3 has been transmitted, the information is automatically erased by the blade 20.

The reading means 7 is located opposed to the conveyance path formed by the conveyance means 6, and reads the information written on the sheet 3 which is conveyed by the conveyance means 6. The reading means 7 is provided in the manner that the reading means 7 does not rub the surface of the sheet 3, at least, when the reading means 7 reads the information written on the sheet 3. The transmitting means 9 and the receiving means 10 are assembled in a transmitting/receiving unit 21 located lower the operation section 4.

In a recording section 11, the information written on the sheet 3 is read out by a CCD 25 through mirrors 22, 23, and a correction plate 24, and the information can be recorded on a recording sheet 27 by a thermal head 26. Accordingly, when the record of the transmitted information is necessary, a copy mode is operated by pressing a predetermined button provided in the operation section 4, and the information is copied on a recording sheet 27 which is a recording medium; a transmission address and transmission time are also written on the copy; and a message of the completion of the transmission can be written on the copy. Further, when the transmission to plural locations is necessary, the plural addresses are printed on the copy.

Further, information transmitted from other facsimile apparatus is recorded on the recording sheet 27 by the thermal head 26. The thermal head 26 is located opposed to a platen roller 28. The recording sheet 27 is conveyed from a recording sheet roll 30 which is set in a central receiving portion 29 in the apparatus main body 1; a sheet detection sensor 31 is provided at the front of the platen roller 28 in the conveyance path; and an end mark sensor 32 and a cutter unit 33 are located at the rear of the platen roller 28.

As described above, in the facsimile apparatus, the following operations are conducted: the sheet 3 on which information has been written is set on the platen 2; transmission is started by the operation section 4; the sheet is conveyed by the conveyance means 6; the information written on the sheet 3 is read by the reading means 7; and the information read by the reading means 7 is transmitted by the transmitting means 9. As stated above, when the sheet 3 on which information can be repeatedly written is used, the information written on the sheet 3 is erased after the transmission has been completed; new information is written again on the sheet 3; and the sheet 3 can be repeatedly used. As an example described later, when a light transmissive sheet is used as the sheet 3, the sheet 3 may be read from the rear surface side.

Figure 4:
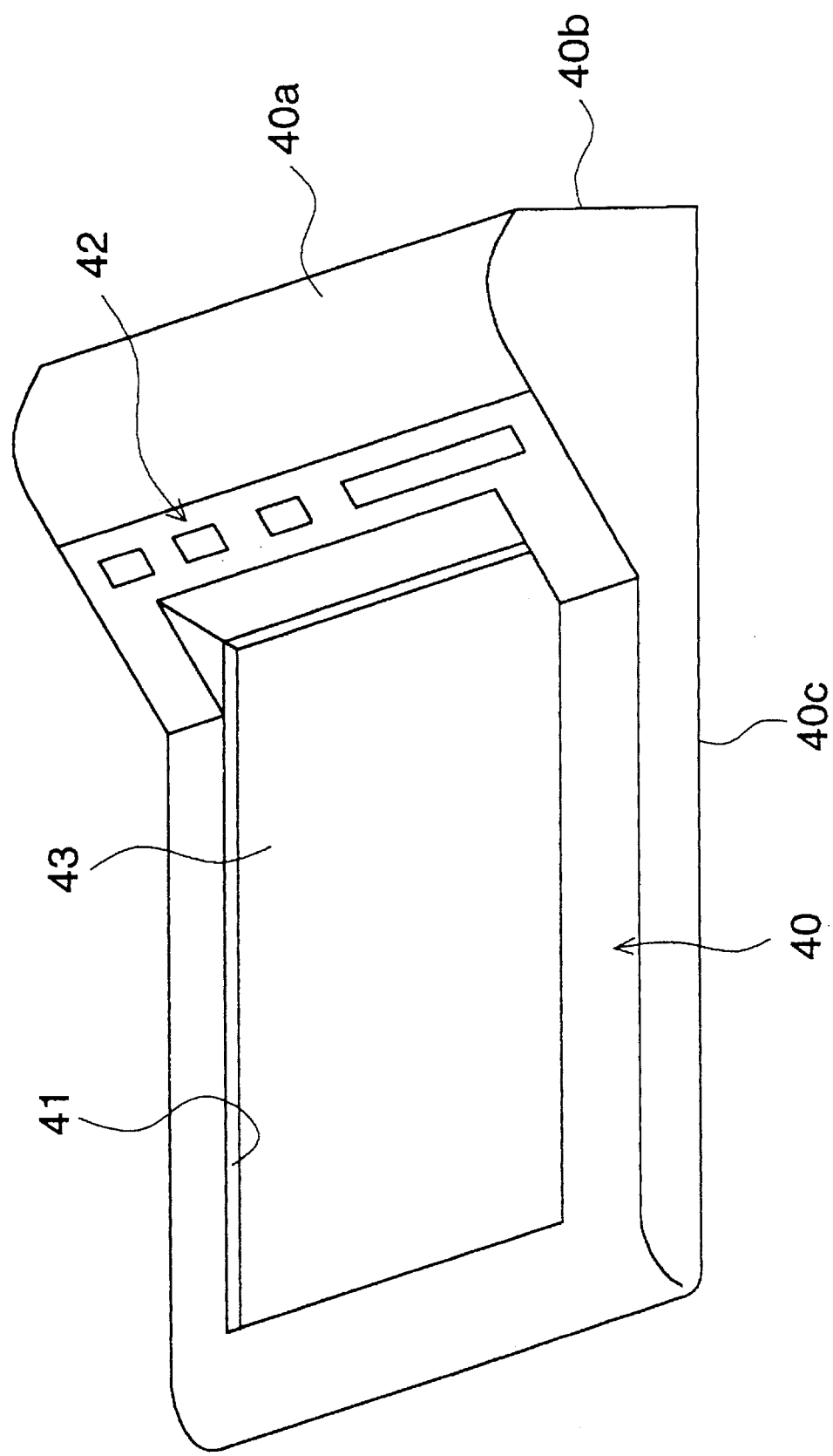
FIG. 4 is a perspective view of the facsimile apparatus.
Figure 5:
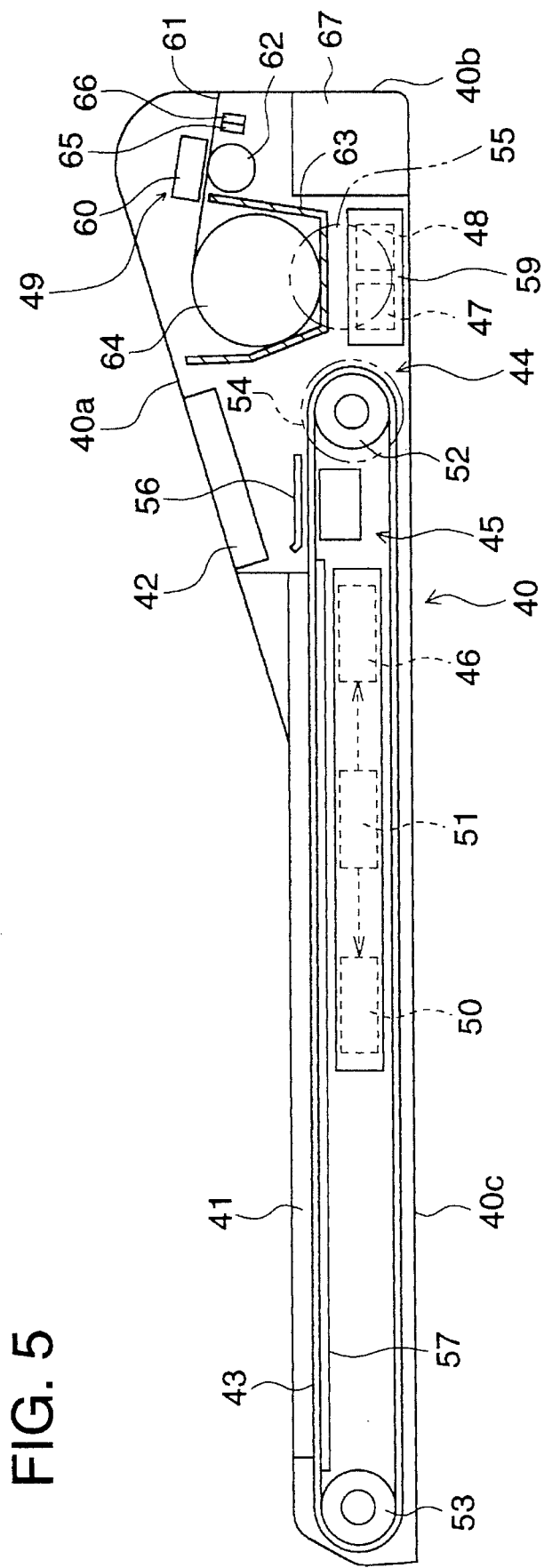
FIG. 5 is a sectional view of the facsimile apparatus.
Figure 6:
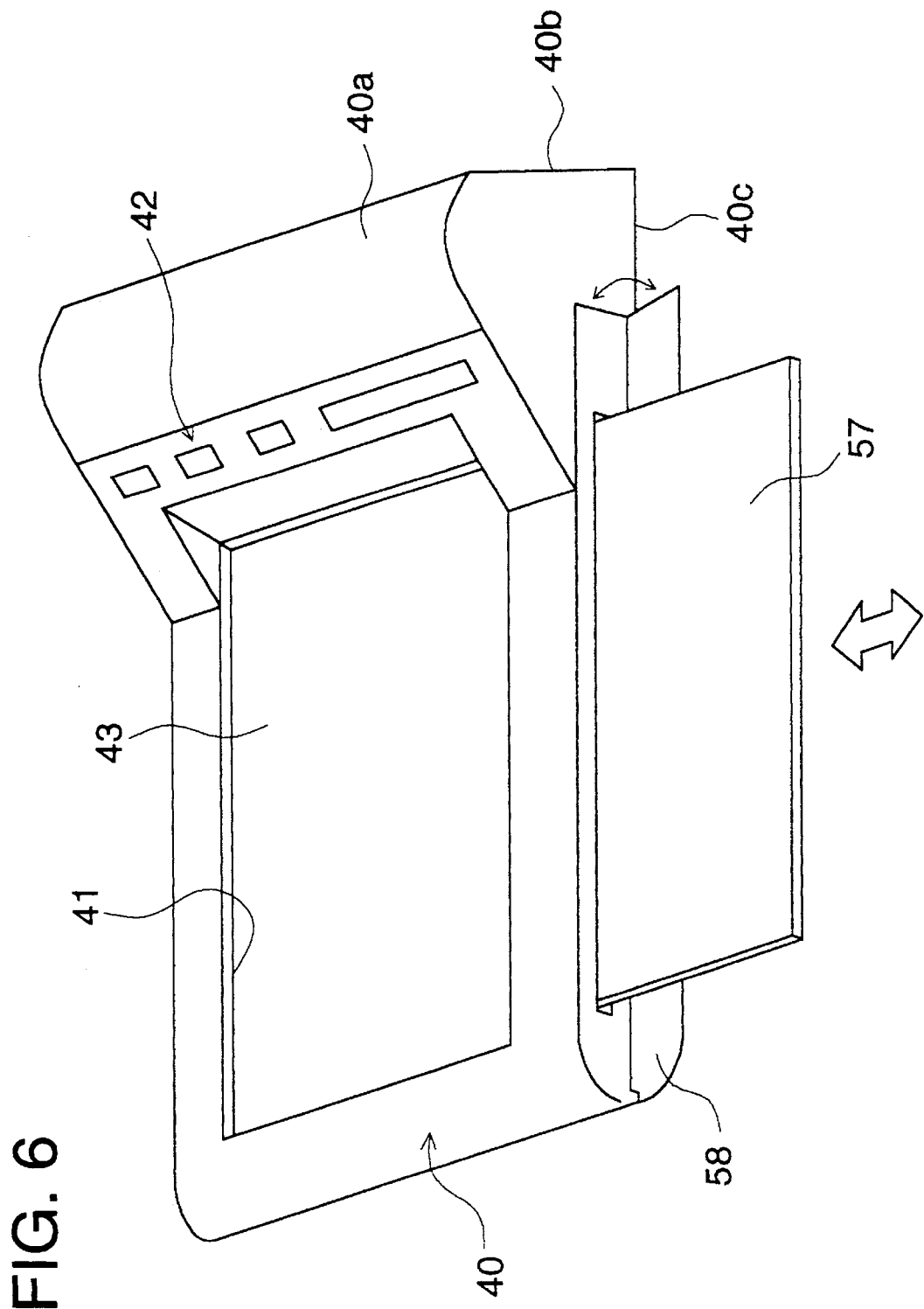
FIG. 6 is a view showing a condition of change of a board.

FIGS. 4 through 10 show other examples of the facsimile apparatus. FIG. 4 is a perspective view of the facsimile apparatus. FIG. 5 is a sectional view of the facsimile apparatus. FIG. 6 is a view showing conditions under which the board is exchanged. FIGS. 7 through 10 are plan views showing examples of the board.

In this facsimile apparatus, an apparatus main body 40 is formed to be thin; a large window portion 41 is formed in the apparatus main body 40; and an operation section 42 is provided at one side of the window portion 41. Each kind of apparatus is provided in a case portion 40a in which the operation section 42 of the apparatus main body 40 is housed, and further, a flat surface portion 40b is formed on a side portion of the case portion 40a.

A base portion 40c of the apparatus main body 40 of this facsimile apparatus can be placed on a table or the like, and characters or the like can be written under the condition that the facsimile apparatus is laid so that a sheet 43, which is positioned in the window 41 and previously provided, and on which information can be repeatedly written, is positioned to be approximately horizontal. Further, the flat surface portion 40b of the apparatus main body 40 is placed, for example, on a table or the like, and the facsimile apparatus can be raised so that the sheet 43, which is positioned in the window 41 and previously provided, and on which the information can be repeatedly written, is positioned to be approximately vertical.

As described above, since the facsimile apparatus is formed so that the facsimile apparatus can stand, the facsimile apparatus is laid in the case where information is written on the sheet, and the facsimile apparatus can be raised other than the above case. Accordingly, space is saved, and the facsimile apparatus can also be used as a board for memorandums.

In the facsimile apparatus, the following means are provided: a sheet 43 which is previously provided and on which information can be repeatedly written; a conveyance means 44 which is positioned above the sheet 43 during stand-by for the conveyance operation, and which conveys the sheet 43 when the conveyance means receives a transmission command; a reading means 45 which reads the information written on the sheet 43 during conveyance; a memory section 46 which stores the readout information; a transmitting means 47 which transmits the information read out by the reading means 45; a receiving means 48 which receives the information transmitted from other facsimile apparatus; a recording section 49 which records the received information and the transmitted information in a recording medium; a memory 50 for control in which a program for controlling the apparatus is stored; and a CPU 51 which controls the whole apparatus.

As the sheet 43 which is previously provided and on which information can be repeatedly written, for example, an endless belt-shaped sheet, which is transparent and has a predetermined length, is used. The sheet 43 may be used, for example, for memorandums.

A conveyance means 44 comprises a pair of conveyance rollers 52, 53, and a conveyance motor 54. The pair of conveyance rollers 52, 53 are respectively located at both sides of the window portion 41. The sheet 43 is stretched between the pair of conveyance rollers 52, 53, and the conveyance roller 52 is rotated by the conveyance motor 54 and the sheet 43 is conveyed.

An image sensor for image reading is used as the reading means 45, and the reading means 45 is provided opposed to the sheet 43 under the condition that the reading means 45 is contacted with the sheet 43 which is in conveyance. The reading means 45 is not limited to the foregoing, but it may also be in a non-contact condition. A white reflection plate 56 is provided opposed to the reading means 45, so that the information written on the sheet 43 conveyed by the conveyance means 44 can be correctly read by the reading means 45. In this connection, in the case where the reading means 45 is provided on the image writing side of the sheet 43, the reading means 45 must be in a non-contact condition with the sheet 43.

The sheet 43 is achromatic and transparent. However, any sheet may be used so long as the sheet can transmit light, and it is not limited to be achromatic and transparent. The image written on the sheet 43 is read from the side opposed to the writing side. The electrical image information which has been read is reversed from left to right. That is, since the electric signal according to the read-out image is based on the image in which left and right are reversed, the image is corrected so that left and right are original, and after that, the information is transmitted. Further, a board 57, the size of which is at least equal to the surface on which the information is written (the size corresponding to one page of a document to be transmitted), is provided inside the sheet 43, so that writing is easily carried out.

The board 57 is in sliding contact with the sheet 43, and stably supports the sheet 43. The board 57 is white, so that the information written on the sheet 43 can more easily be read. Further, it may be preferable that ruled lines are provided on the board 57 so that writing can be more easily performed. Further, the board 57 can also be structured by a liquid crystal plate and a means which can output predetermined ruled lines. Further, the board 57 is structured as follows: a door 58 is provided to the apparatus main body 40 as shown in FIG. 6; and the board 57 can be replaced from a side of the apparatus main body 40 when the door is opened and closed.

Figure 7:
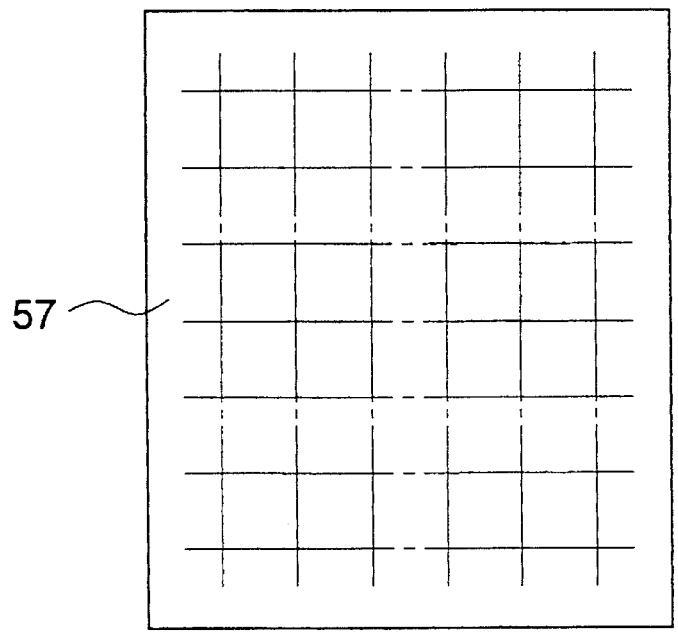
FIG. 7 is a plan view showing an example of the board.
Figure 8:
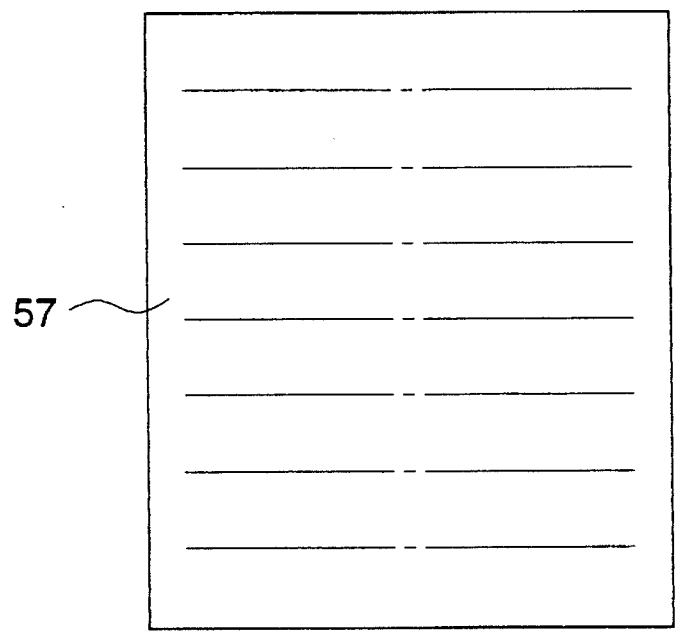
FIG. 8 is a plan view showing an example of the board.
Figure 9:
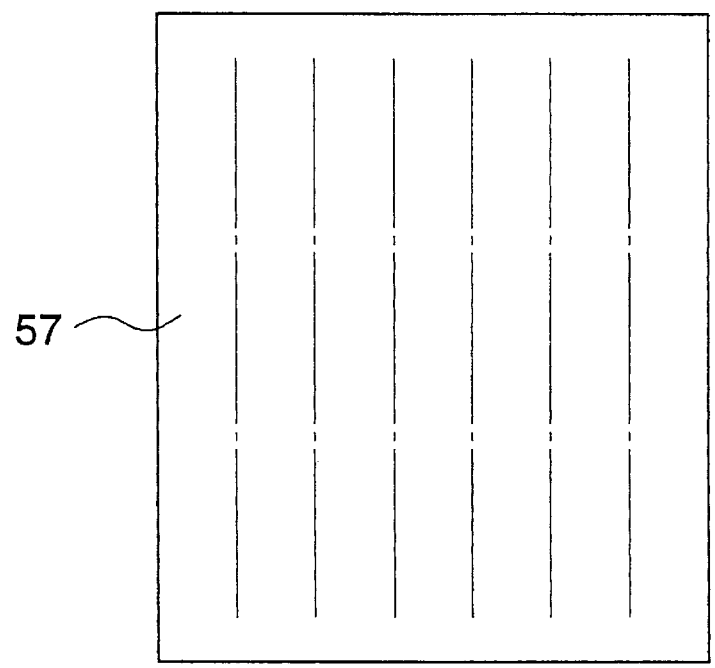
FIG. 9 is a plan view showing an example of the board.
Figure 10:
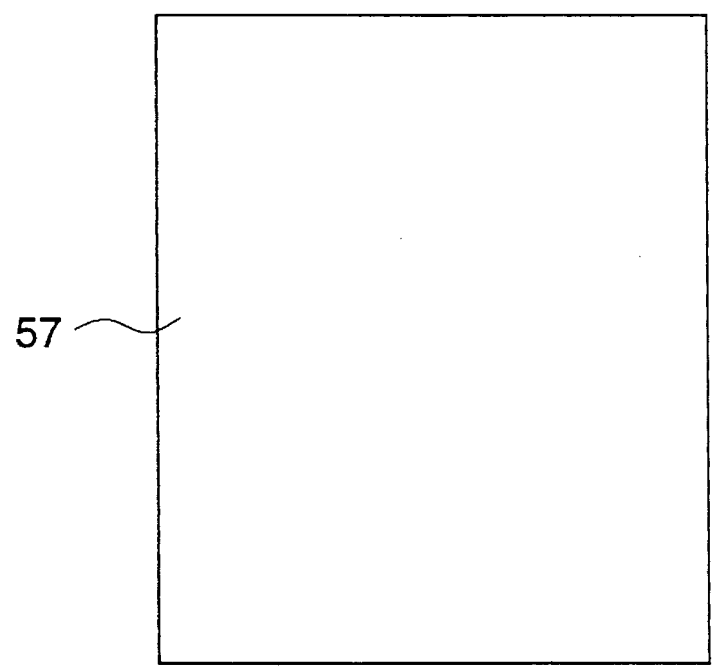
FIG. 10 is a plan view showing an example of the board.

A board having predetermined ruled lines as shown in FIGS. 7 through 9, or a board having no-ruled line as shown in FIG. 10, can be used for the board 57. As described above, a plurality of boards having predetermined ruled lines or patterns are provided, so that the board 57 can be replaced with the board having desired ruled lines or patterns.

Further, a liquid crystal plate may be used, and an image of ruled lines or a specific pattern can be switched and displayed, without replacing the board 57.

The transmitting means 47 and receiving means 48 are provided in the transmitting/receiving unit 59, and the information transmitted from other facsimile apparatus is recorded on a recording sheet 61 by a thermal head 60 in the recording section 49. The thermal head 60 is located opposed to a platen roller 62. Further, the recording sheet 61 is conveyed from a recording sheet roll 64 which is set at a central receiving portion 63 in the apparatus main body 40 by a drive motor 55. A sheet detection sensor 65 and an end mark sensor 66 are located at the rear portion of the platen roller 62 in the conveyance path. Further, a battery 67 is housed in the apparatus main body, and is a power source for the conveyance motor 54 and the CPU 51.

As described above, the sheet 43 on which information can be repeatedly written is previously provided, and this sheet 43 is located at a position at which information can be written on the sheet during stand-by. In this condition, information is written on the sheet 43. When a transmission command is received, the conveyance means 44 conveys the sheet 43; the reading means 45 reads the information written on the sheet 43 during this conveyance; and this information is transmitted by the transmitting means 47. As described above, since the sheet 43 on which information can be repeatedly written is previously provided in the apparatus main body, for example, there is no possibility that the sheet 43 is lost, which is specifically convenient for family use.

In this facsimile apparatus, the sheet 43 is formed into an endless belt, which has a predetermined length; only a portion on which information can be written is exposed outside the apparatus through a window portion 41; a portion on which information has already been written is conveyed into the apparatus by the conveyance means; information is written on a portion which is newly exposed, and the current information written on the portion can be transmitted to the same address as the foregoing transmission message as the next page; and the next portion, on which information is written, can be smoothly exposed.

Further, in this facsimile apparatus, when a portion, on which information has been written, of the endless belt-shaped sheet 43 is conveyed into the apparatus by the conveyance means 44, the information on the portion is read by the reading means 45 during conveyance; the information read by the reading means is stored in the memory section 46; and the information is transmitted by the transmitting means after the information has been inputted into the memory section 46.

Further, in this facsimile apparatus, in the case where a plurality of transmission messages are transmitted, when a specified button is pushed at the time of completion of writing, the following processes are repeatedly conducted: the endless belt-shaped sheet 43 is conveyed by the conveyance means 44 so that a portion on which information is newly written is exposed, and the sheet 43 on which information has been written is conveyed into the apparatus. A reading operation by the reading means 45 is repeated corresponding to the above-described processes; the information which has been read out is inputted into the memory section 46 for each sheet and stored in the memory section 46; the information is transmitted by the transmitting means 47 after the information has been inputted into the memory section 46; and a plurality of transmission messages can be transmitted by the endless belt-shaped sheet 43 for a short period of time.

Figure 11:
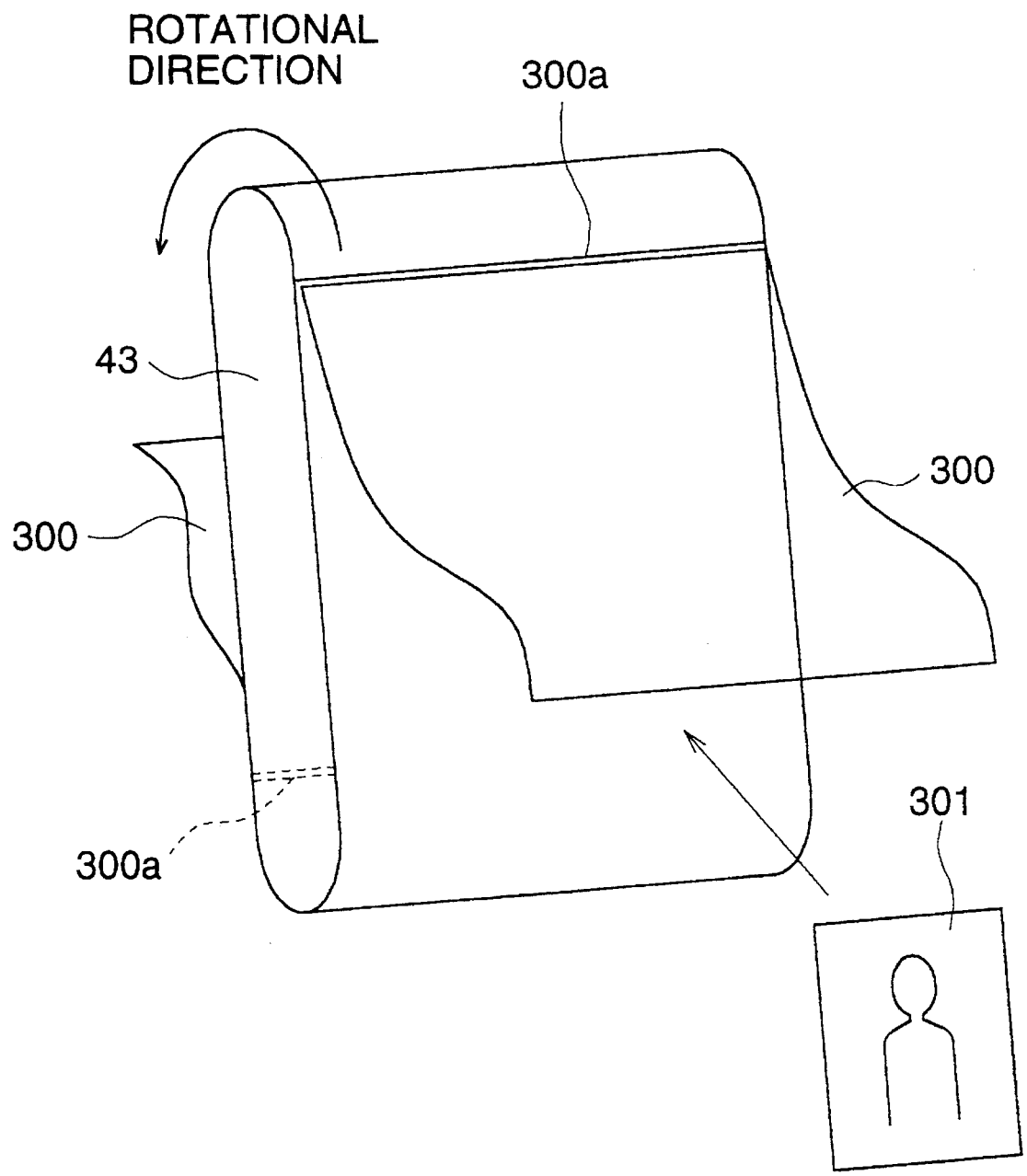
FIG. 11 is a perspective view showing another example of a sheet on which information can be repeatedly written.
Figure 12:
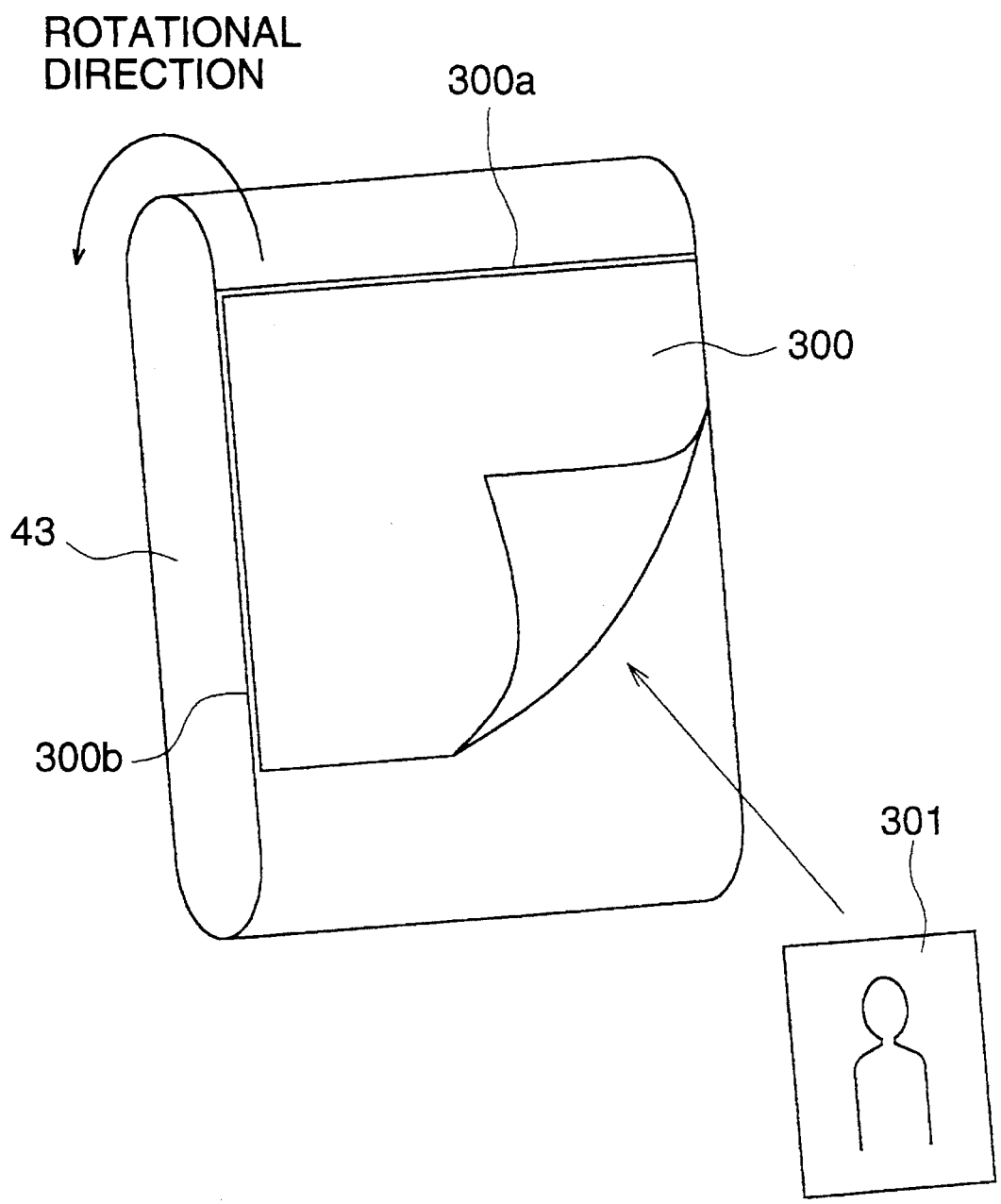
FIG. 12 a perspective view showing still another example of the sheet on which information can be repeatedly written.

FIGS. 11 and 12 shows other examples of the sheet 43 on which information can be repeatedly written. In the example in FIG. 11, an end portion 300*a* of the conveyance direction side of the transparent sheet 300 is adhered to the sheet 43 which is formed to be an endless belt, and an original document 301 like an original paper such as, for example, a newspaper article, a photograph, or the like, can be sandwiched between the sheet 43 formed to be an endless belt and the transparent sheet 300, and can be transmitted. In this case, the information which is repeatedly written is written on the transparent sheet 300.

In the example in FIG. 12, the end portion 300*a* of the conveyance direction side of the transparent sheet 300, and the other end portion 300*b* which is along the end portion 300*a* and an end portion of the sheet 43, are adhered to the sheet 43 which is formed to be an endless belt. An original document 301 like an original paper such as, for example, a newspaper article, a photograph, or the like, can be sandwiched between the sheet 43 formed to be an endless belt and the transparent sheet 300, and can be transmitted.

In FIGS. 11 and 12, the transparent sheet is used as the sheet 43 formed to be an endless belt. When the document 301 is read from the rear side, the upper surface of the document 301 is placed downward, being opposed to the sheet 43. Due to the foregoing, also in the facsimile apparatus shown in FIG. 5, an ordinary document such as a photograph, a newspaper article, and an original document can be transmitted. (A)

The endless belt 43 always starts from a predetermined position (a home position) by a drive power source not shown in the drawing, and stops at the same position for stand-by. That is, in the movement of the endless belt 43, one point on the film completes just a half-cycle from its start to its stop in the example shown in FIG. 11, and completes just one cycle in the example shown in FIG. 12. This is due to the reason why the document holding means by the endless belt and sheet 300 can always be available. When the document holding means stops on the rear surface side of the apparatus under the condition that the document is sandwiched by the document holding means, it causes sheet jamming and inconvenience, and therefore, the stop position of the endless belt must always be constant. Further, in these examples, the following may be available: an erasing means which erases the message on the writing surface is provided on the downstream side of the reading means 45, and when the endless belt is operated and stops at the home position, the message on the writing surface is erased, and a new message can be written on the surface.

Figure 13:
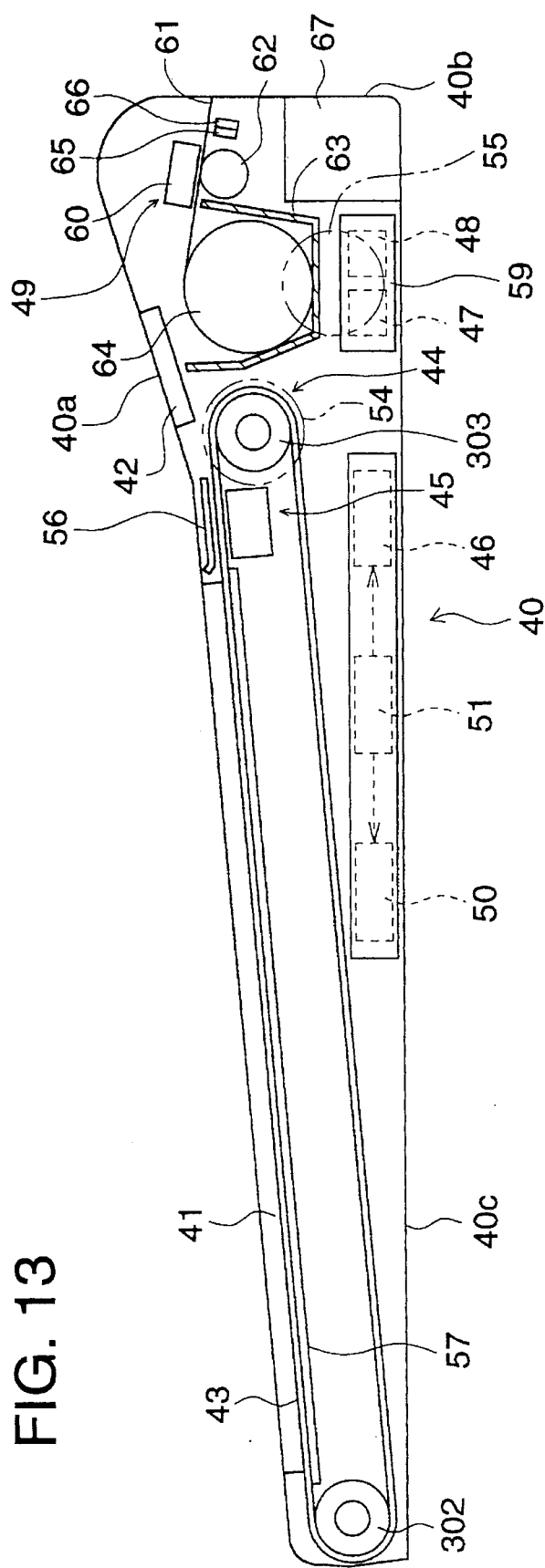
FIG. 13 is a sectional view showing another example of the facsimile apparatus.
Figure 14:
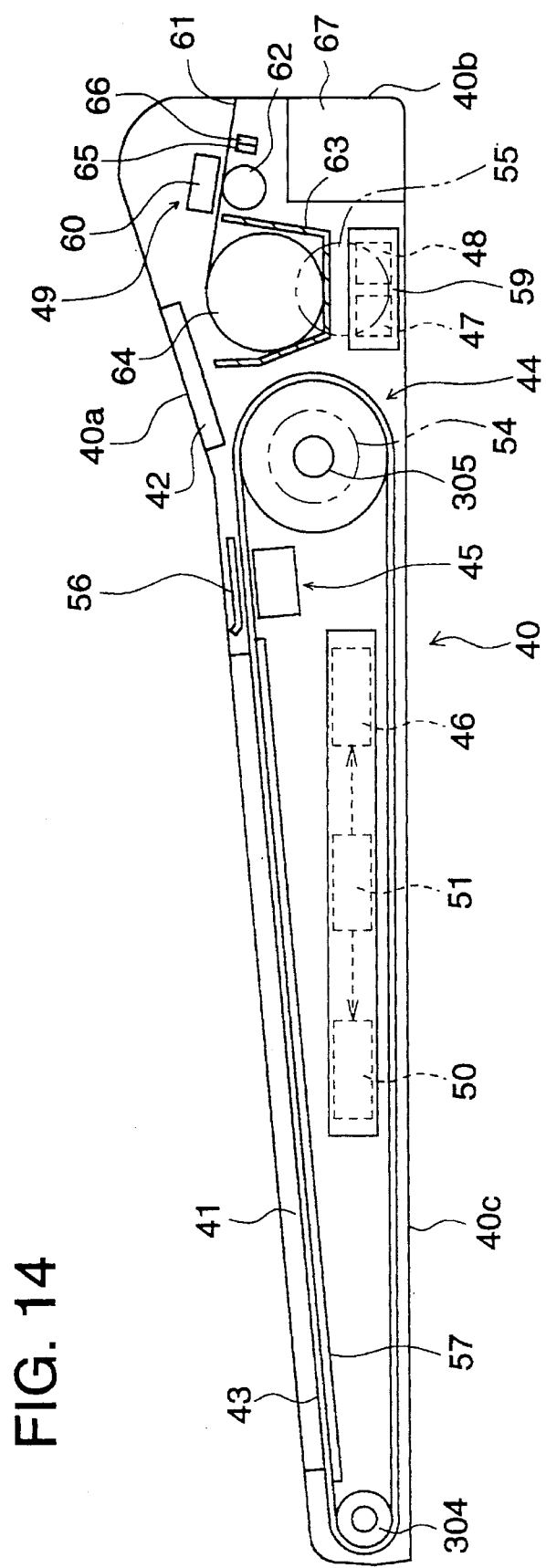
FIG. 14 is a sectional view showing still another example of the facsimile apparatus.

FIGS. 13 and 14 show other examples of the facsimile apparatus. In the facsimile apparatus shown in FIG. 13, diameters of a pair of conveyance rollers 302 and 303 are formed to be the same. The conveyance roller 302 is placed at a lower position with respect to a bottom portion 40*c*, and the conveyance roller 303 is placed at a higher position with respect to the bottom portion 40*c*. As described above, the apparatus is structured as follows: positions of a pair of the conveyance rollers 302, 303 are changed and the rollers are placed at the positions described above; the writing surface of the sheet 43, on which information can be repeatedly written, of the endless belt is inclined with respect to the bottom surface of the apparatus; further, the window portion 41 is also inclined corresponding to the sheet 43; and therefore, the information can be more easily written on the sheet 43.

Further, in the facsimile apparatus shown in FIG. 14, the diameter of the conveyance roller 305 is larger than that of the conveyance roller 304. As described above, when the diameters of a pair of the conveyance rollers 304, 305 are different from each other, the writing surface of the sheet 43, on which information can be repeatedly written, of the endless belt is structured to be inclined with respect to the floor, and the window portion 41 is also inclined corresponding to the sheet 43, so that information can be easily written on the sheet 43.

When the diameter of the conveyance roller 304 is made smaller than that of the conveyance roller 53 of the facsimile apparatus shown in FIG. 5, the thickness of the apparatus main body 40 can be reduced more than that of the facsimile apparatus shown in FIG. 5 by the dimension obtained by the decrease of the diameter of the conveyance roller 304, so that the apparatus becomes more compact.

Figure 15:
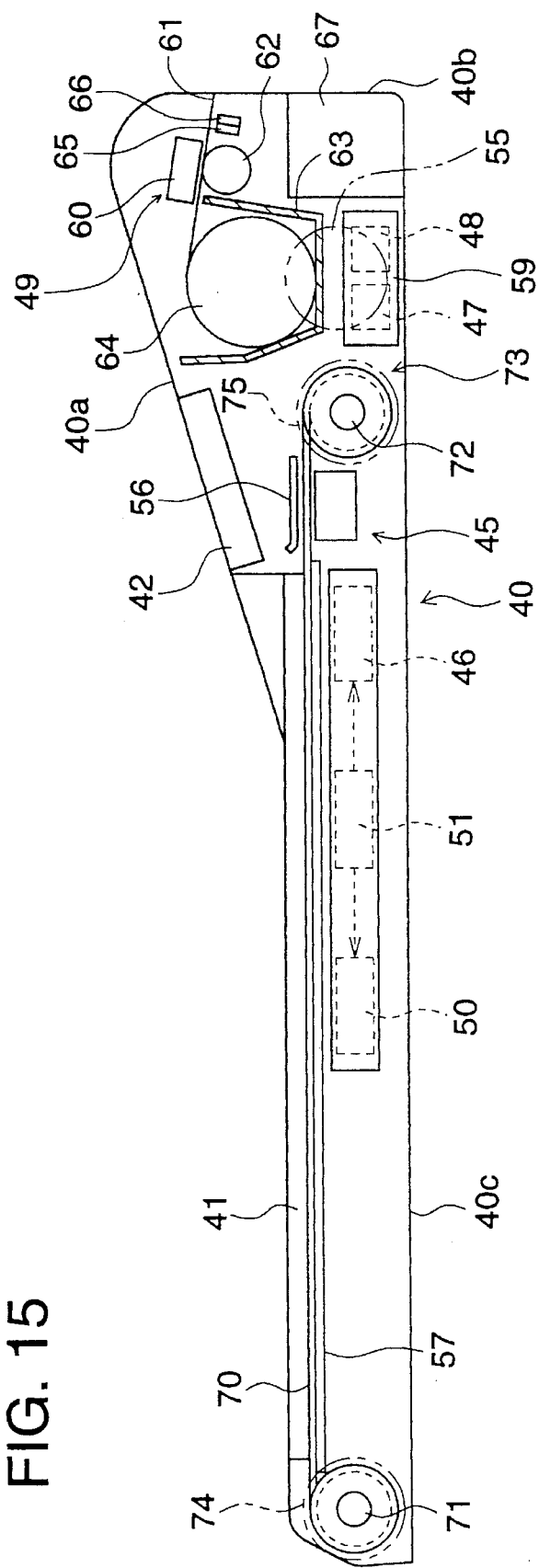
FIG. 15 is a sectional view showing another example of the facsimile apparatus.

FIG. 15 is a sectional view showing another example of the facsimile apparatus. In this facsimile apparatus, a sheet 70 is a sheet having a predetermined length and roll-curtain-shaped, and a conveyance means 73 having winding shafts 71 and 72 on both sides of the sheet are placed. Winding shafts 71, and 72 are respectively driven by motors 74 and 75. When one of the motors 74 and 75 is driven, the sheet 70 is wound around the winding shaft which is connected to the driving motor, so that the sheet 70 can be conveyed by a simple structure. Since other structures of this facsimile apparatus are the same as those of the foregoing examples, the same numbers are denoted and the explanation is omitted.

Figure 16:
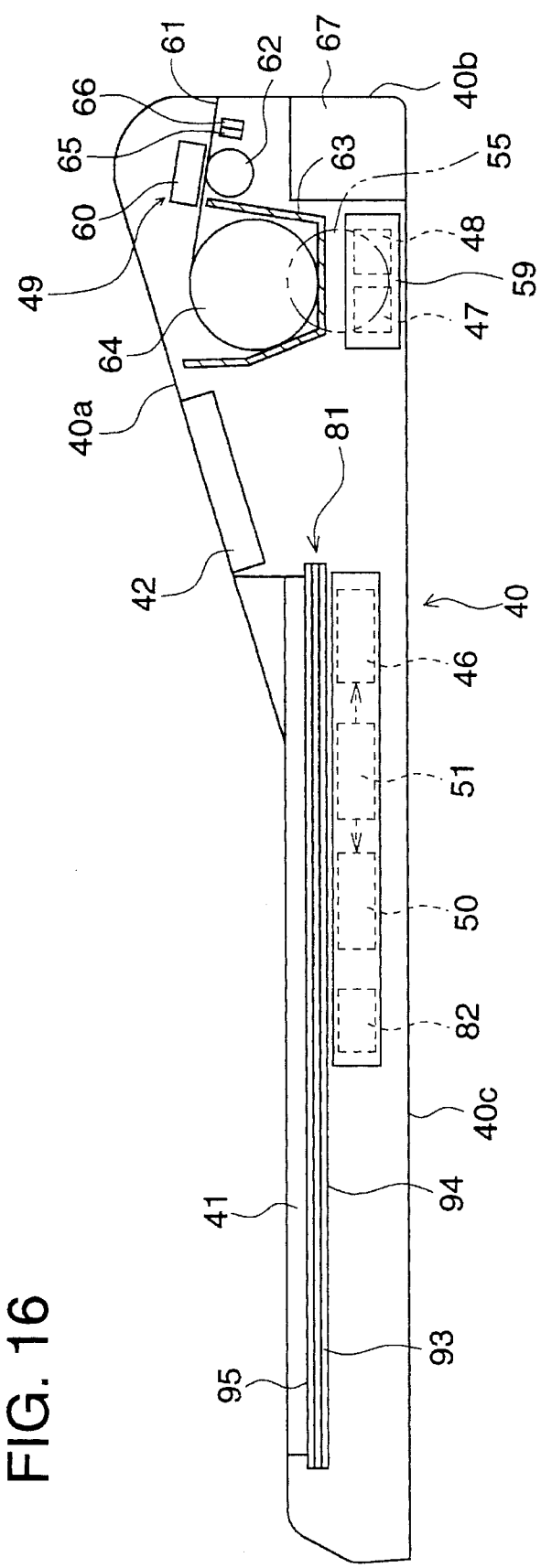
FIG. 16 is a sectional view of the facsimile apparatus.
Figure 17:
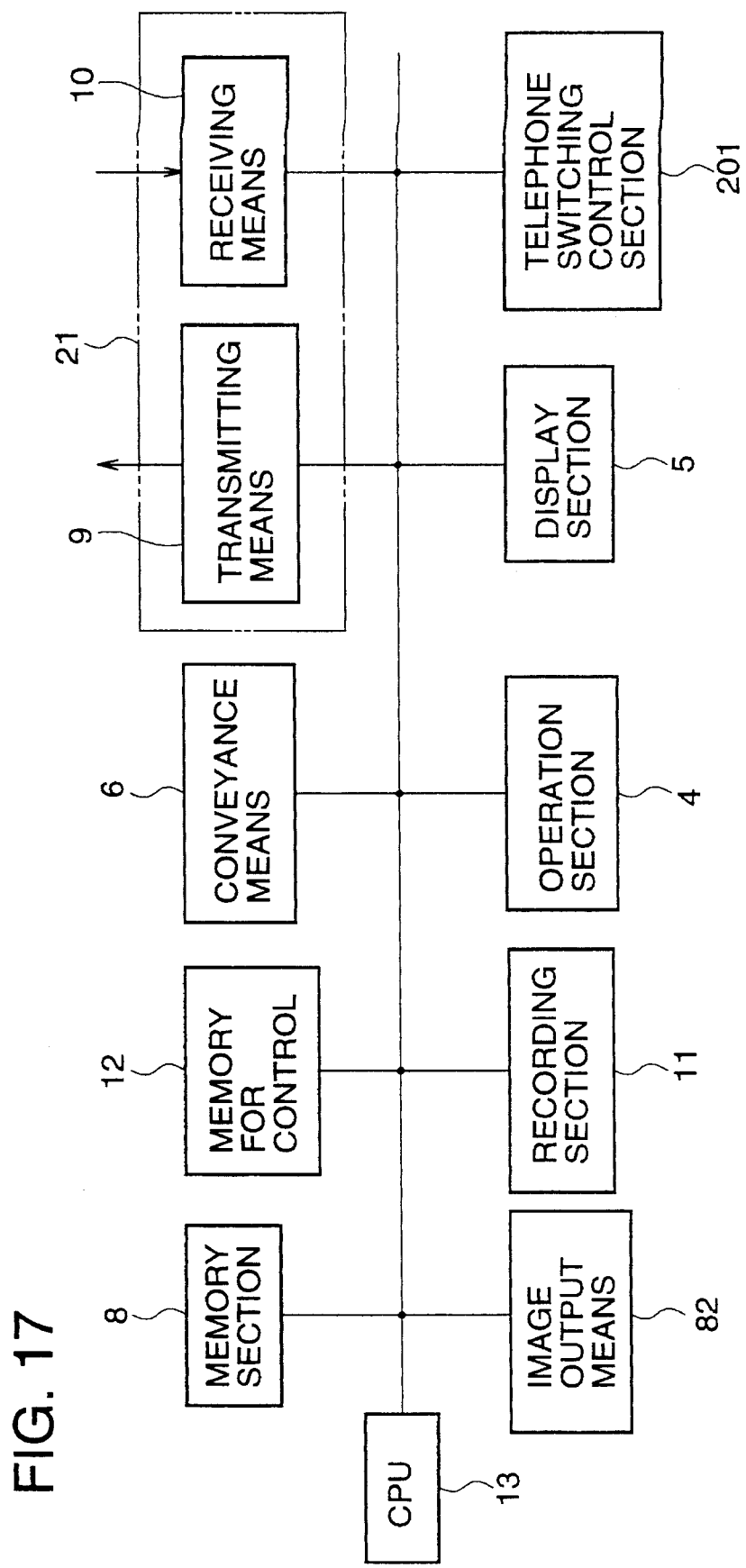
FIG. 17 is a block diagram showing the outline structure of the facsimile apparatus.
Figure 18:
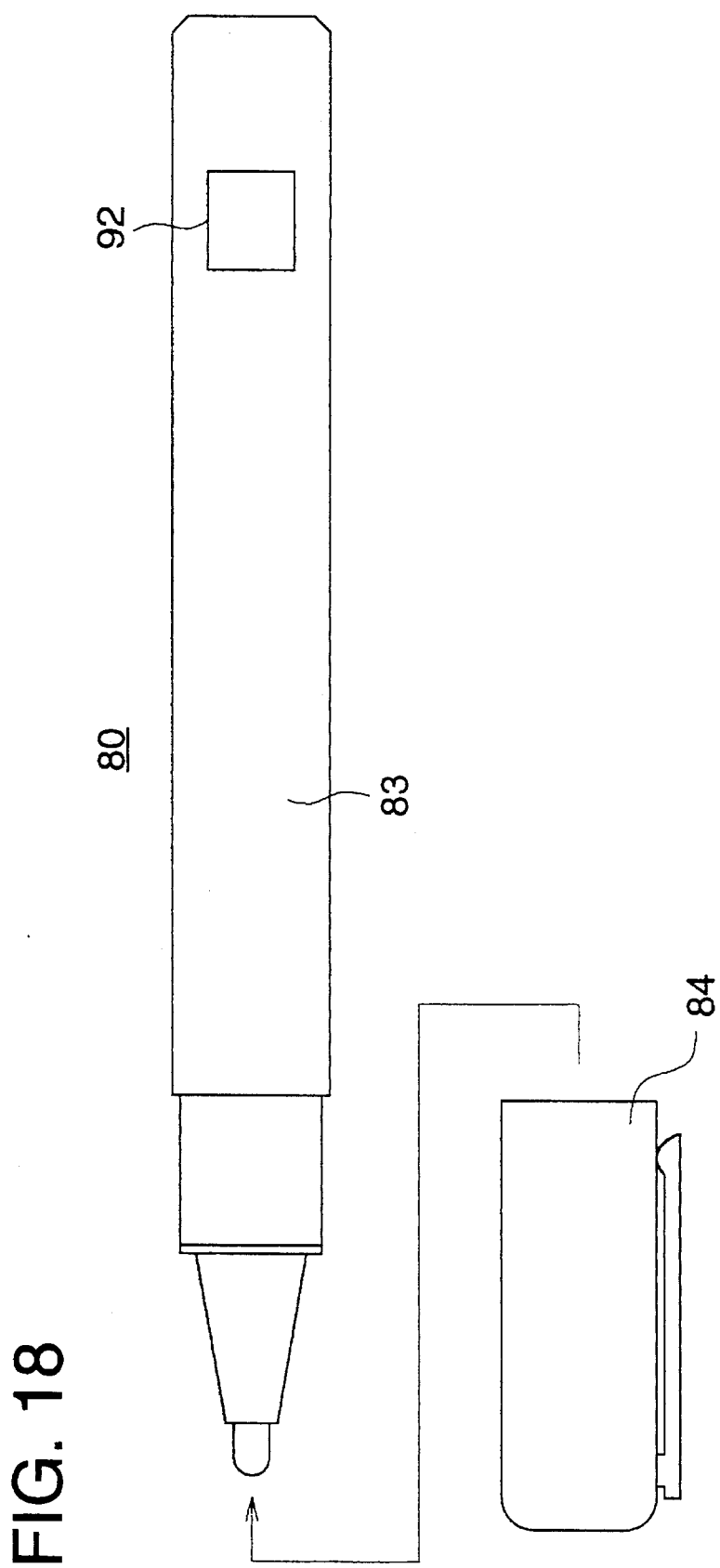
FIG. 18 is a side view of a pen.
Figure 19:
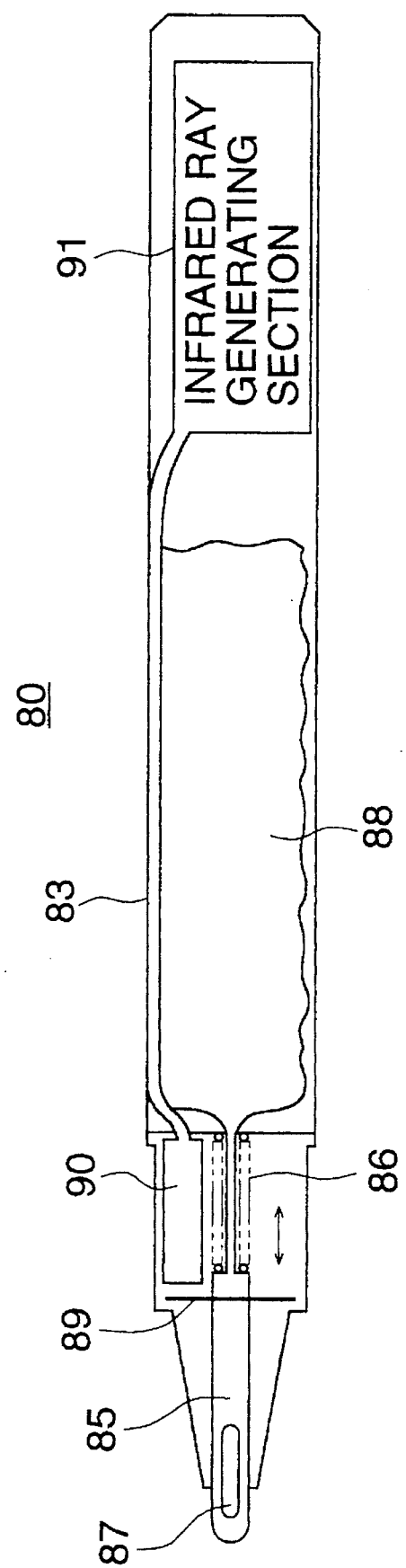
FIG. 19 is a sectional view of the pen.
Figure 20:
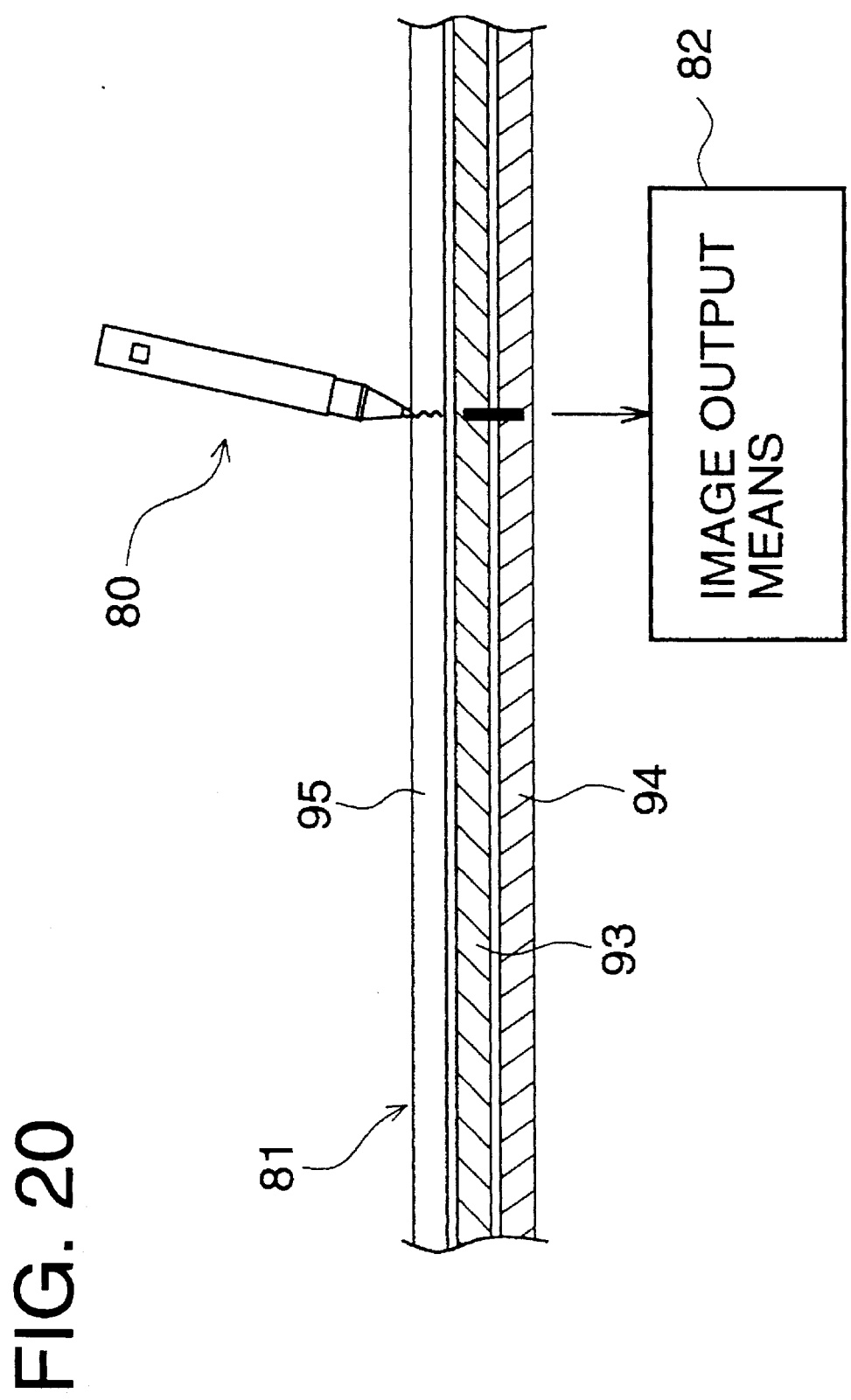
FIG. 20 is a view showing conditions under which information is written by the pen.

FIGS. 16 through 20 show other examples of the facsimile apparatus, in which FIG. 16 shows a sectional view of the facsimile apparatus, FIG. 17 shows a block diagram of the outline structure of the facsimile apparatus, FIG. 18 shows a side view of a pen, FIG. 19 is a sectional view of the pen, and FIG. 20 shows a condition under which information is written by the pen.

This facsimile apparatus comprises: a pen 80 which generates an electromagnetic signal and which oozes ink including dyes which can be visually recognized; a sheet 81 on which a visual image is formed by adhesion of the ink, and which receives a signal outputted from the pen 80 and can specify a receiving position corresponding to coordinates where the pen 80 has touched the sheet; and an image output means 82 by which the coordinates are calculated according to reception of the signal outputted from the pen 80, and which outputs the image information. Other structures of this facsimile apparatus are the same as those of the foregoing facsimile apparatus, and therefore, the same numbers are denoted and the explanation is omitted.

As shown in FIGS. 18 and 19, the pen 80 comprises a pen main body 83 and a cap 84. In the pen main body 83, a pen portion 85 can be moved in the direction of the axis, and is always forced by a spring 86 toward the direction in which the pen is protruded. An LC circuit 87 is housed in the tip of the pen portion 85, and an ink cartridge 88 is connected to the pen portion 85. In the ink cartridge 88, the ink, including visually recognizable dyes, is stored, and the ink oozes out from the tip of the pen portion 85. A stopper 89 is provided in the pen portion 85, and a switch 90 is provided being opposed to the stopper 89. The switch 90 is connected to an infrared ray generation section 91. When the stopper 89 contacts the switch 90, the switch 90 is turned on, and the infrared ray is generated from the infrared ray generation section 91. When the stopper 89 is released from the switch 90, the switch 90 is turned off, and the infrared ray is not generated from the infrared ray generation section 91.

Accordingly, when the pen 80 is not used, since the pen portion 85 is not pushed, the stopper 89 is released from the switch 90, and the switch 90 is in an "off" condition, so that the infrared ray is not generated from the infrared ray generation section 91. On the other hand, when the pen 80 is used, since the pen portion 85 is pushed, the pen portion 85 is moved, being opposed to the spring 86, the stopper 89 touches the switch 90, and the position is regulated. At this time, the switch 90 is turned on, and the infrared ray is generated from the infrared ray generation section 91. This pen portion 85 and the ink cartridge 88 can be replaced, and a portion 92 of the pen main body 83 which is opposed to the infrared ray generation section 91 is formed with an infrared ray penetrable member.

The sheet 81 is structured as follows: a plane loop antenna in X-direction 93, and a plane loop antenna in Y-direction 94 are superimposed, and further a white board 95 is superimposed on the plane loop antenna in X-direction 93. A visual image is formed when the ink of the pen 80 is adhered to the white board 95. The image written on the white board 95 is erased by the user after the image has been transmitted.

Further, a signal from the pen 80 is received by the plane loop antenna in X-direction 93 and the plane loop antenna in Y-direction 94, and these antennae specify a signal receiving position corresponding to coordinates on the sheet 81 touched by the pen 80. The sheet 81 may be constructed in the manner that the receiving position of the signal from the pen 80 can be specified.

An image output means 82 comprises: a means for specifying the coordinates; a means for storing the coordinate; and a means for generating a signal according to the coordinates, and calculates the coordinates when the signal from the pen 80 is received, and outputs the image signal.

As described above, in this facsimile apparatus, the visual image is formed when the ink of the pen 80 is adhered to the sheet 81; the signal from the pen 80 is received and the signal receiving position corresponding to the coordinates touched by the pen 80 is specified; the coordinates are calculated according to the signal reception from the pen 80, and the image information is outputted, and therefore, the sheet conveyance means is not necessary and the structure becomes simplified.

The pen may be used only for the signal generator, and the white board may be replaced with an liquid crystal board so that the image is displayed on the liquid crystal and can be seen by users. In the case where the image written on the liquid crystal is no longer necessary after the image has been transmitted to another facsimile, the apparatus can be structured as follows: the liquid crystal display disappears when a completion button or clear button is pressed. Further, the apparatus can be structured as follows: a clear switch, not shown in the drawing, is provided to the pen 80; when the clear switch is pressed, an infrared ray for erasing having wavelength different from that of the infrared ray for writing is generated; and a liquid crystal image display at the coordinates on which the infrared ray for erasing has been received disappears.

Figure 21:
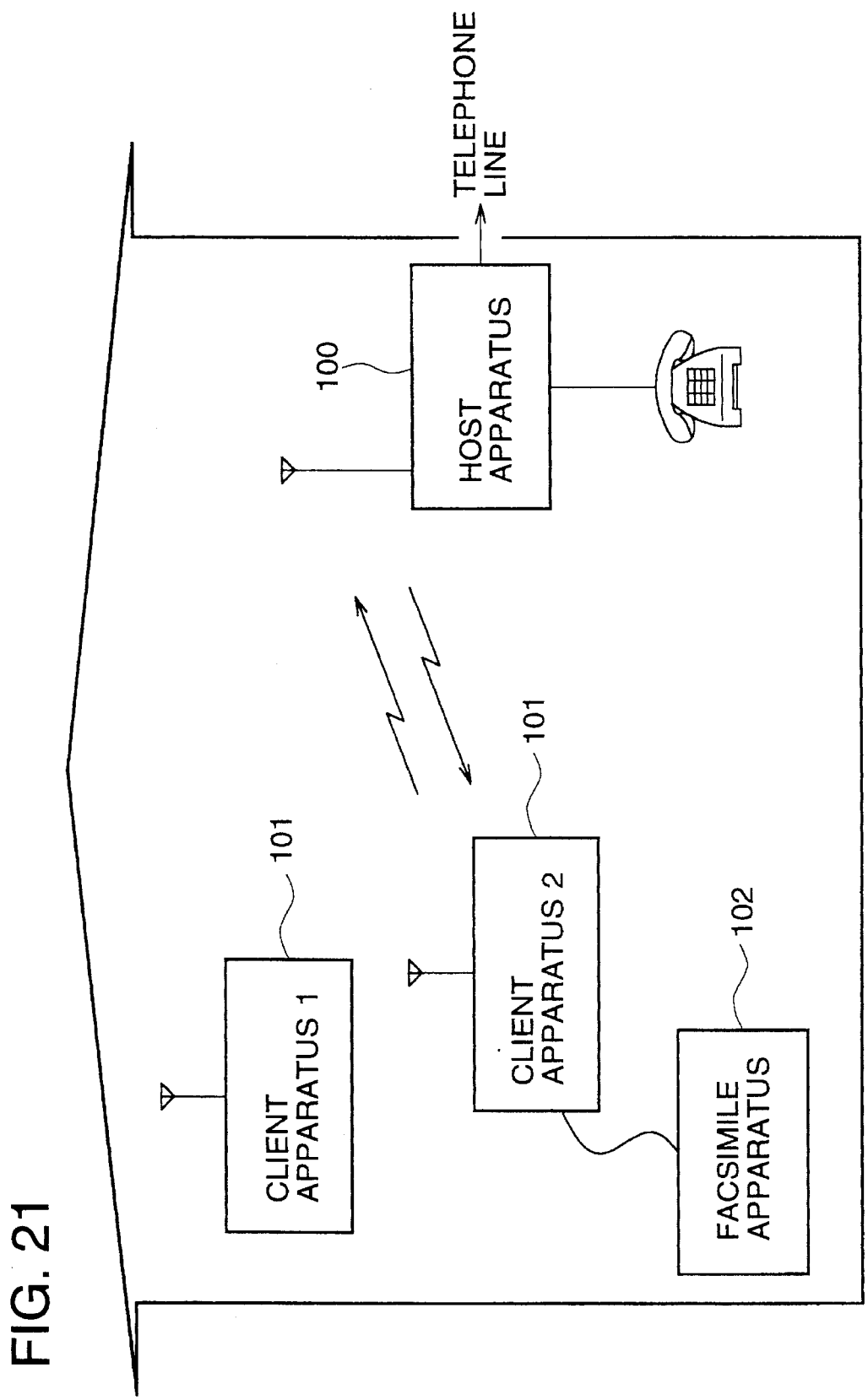
FIG. 21 is a view showing the structure of an example of a facsimile system.

FIG. 21 is a view showing the structure of an embodiment of the facsimile system. This facsimile system comprises: a host apparatus 100 which is connected to a telephone line; and client apparatus 101 to which signals are transmitted from the host apparatus 100 by wireless, and from which signals are received by the host apparatus 100 by wireless. The system has the following transmitting/receiving means: the facsimile apparatus 102 is connected to the client apparatus 101; and the transmitting/receiving signal of the facsimile apparatus 102 is transmitted and received via the client apparatus 101. As described above, the system is structured as follows: the cordless client apparatus 101 can be provided by utilizing a cordless telephone for family use. Accordingly, after the information, such as characters, written on the facsimile apparatus 102 has been read in the apparatus, the information is communicated to the host apparatus 100 by an interphone with this telephone, and the information is transmitted to other facsimile apparatus from the host apparatus. As described above, since the client apparatus 101 is utilized for transmitting/receiving, the facsimile apparatus 102 can be installed at an arbitrary position. As this facsimile apparatus 102, the facsimile apparatus described in the foregoing embodiments can be used, and it is not limited to this type facsimile apparatus. (B)

Further, in this embodiment in which the host apparatus and the client apparatus are provided in the facsimile system, since the number of transmitting/receiving section can be increased as necessary, a network of the system can be established at low cost.

Figure 22:
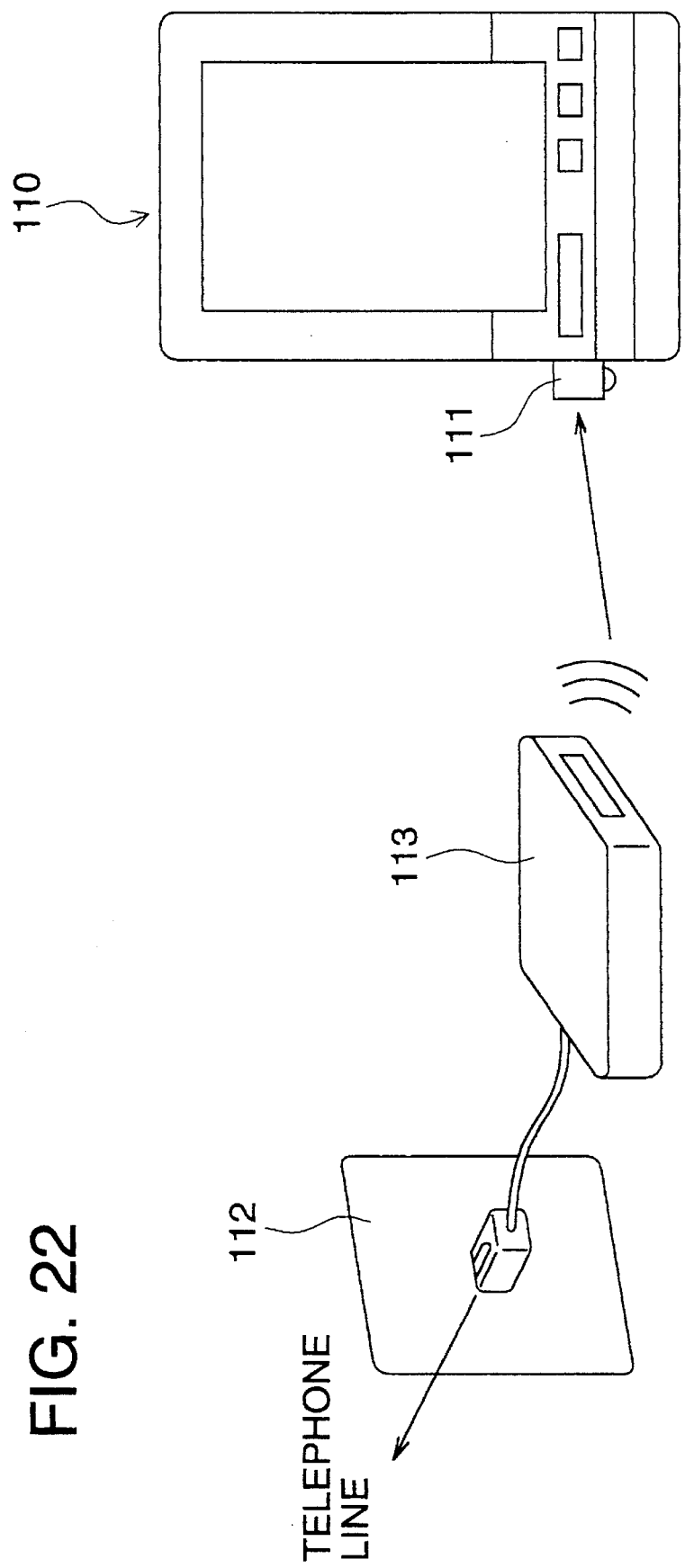
FIG. 22 is a view showing the structure of the facsimile system.
Figure 23:
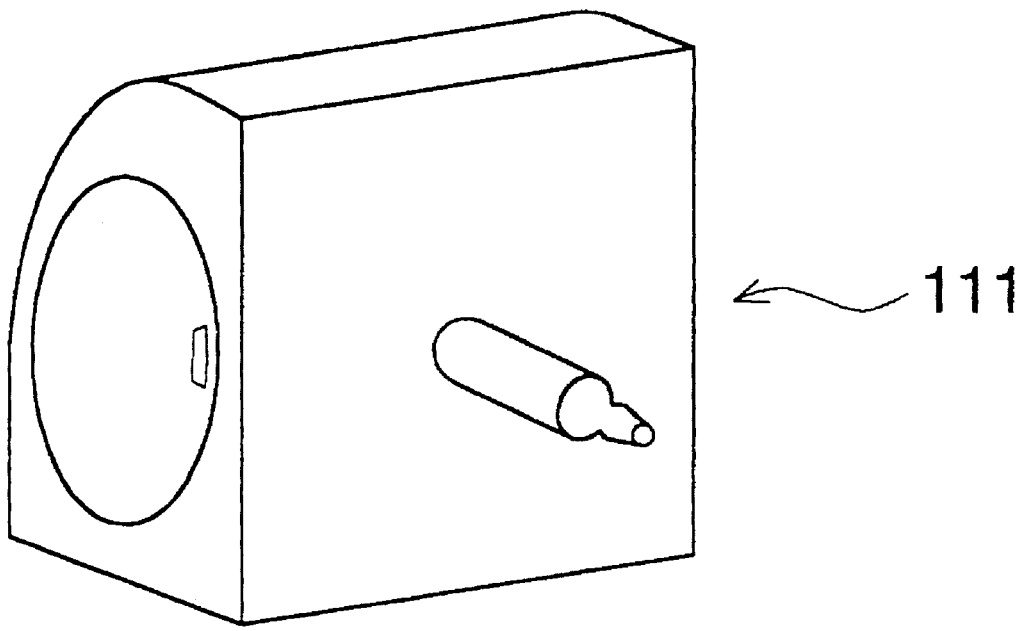
FIG. 23 is a perspective view of an infrared ray transmitting and receiving apparatus.

FIGS. 22 and 23 show other embodiments of the facsimile system, in which FIG. 22 is a view showing the structure of the facsimile system, and FIG. 23 is a perspective view of an infrared ray transmitting/receiving apparatus.

In this facsimile system, the infrared ray transmitting/ receiving apparatus 111 is provided in the facsimile apparatus 110, and the transmitting/receiving signal can be communicated using infrared rays. On the other hand, the infrared ray transmitting/receiving apparatus 113 is provided to a terminal 112 of the telephone line in a room. As described above, in the facsimile apparatus 110, the information can be transmitted to and received from other facsimile apparatus through the infrared ray transmitting/ receiving apparatus 111 and 113. In this facsimile system, any cord is not necessary, and accordingly, the facsimile apparatus 110 can be installed at an arbitrary position. As this facsimile apparatus 110, the facsimile apparatus in the foregoing embodiments can be used, and it is not limited to this type facsimile apparatus.

Figure 24:
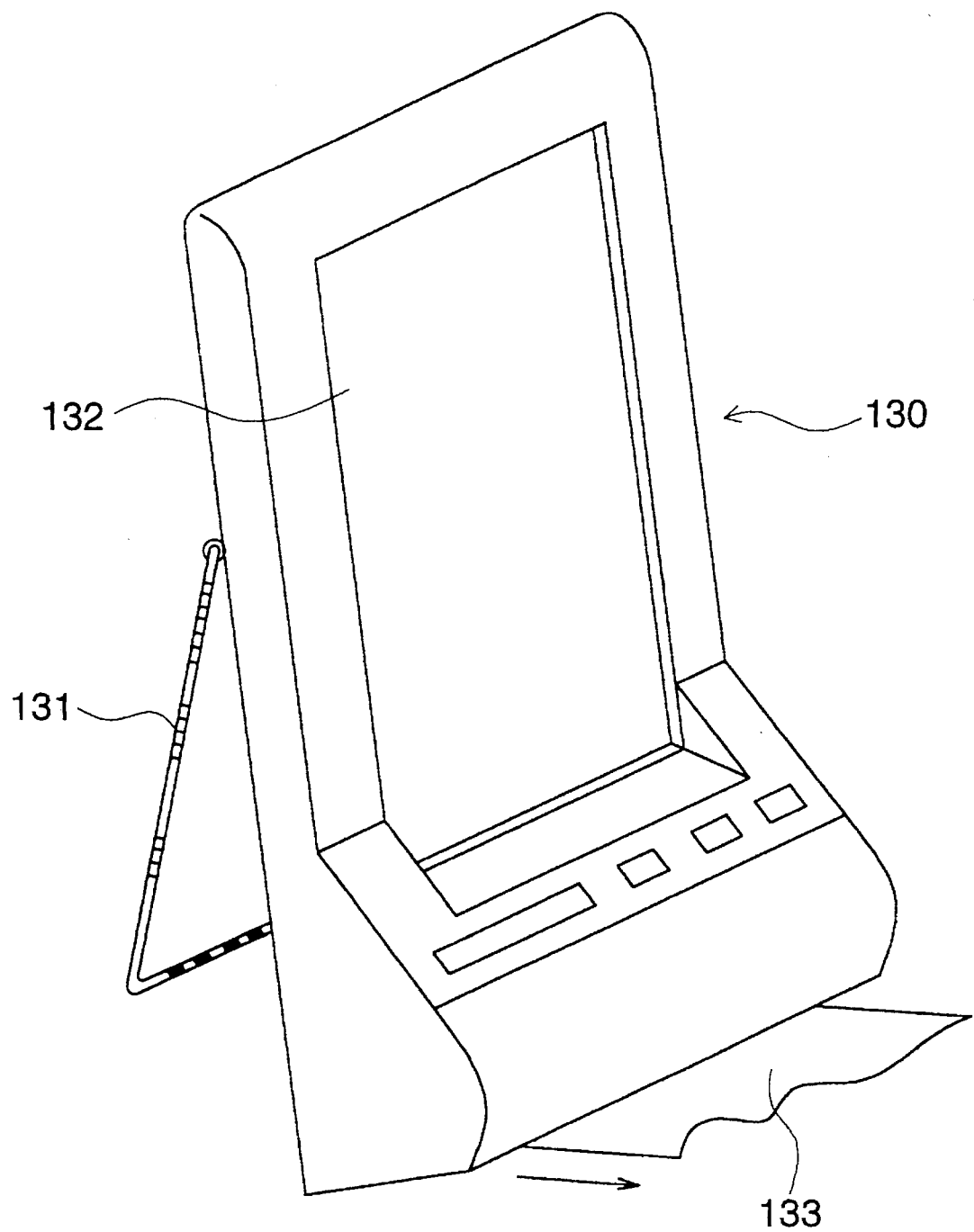
FIG. 24 is a view showing a normal setting condition of the facsimile apparatus.
Figure 25:
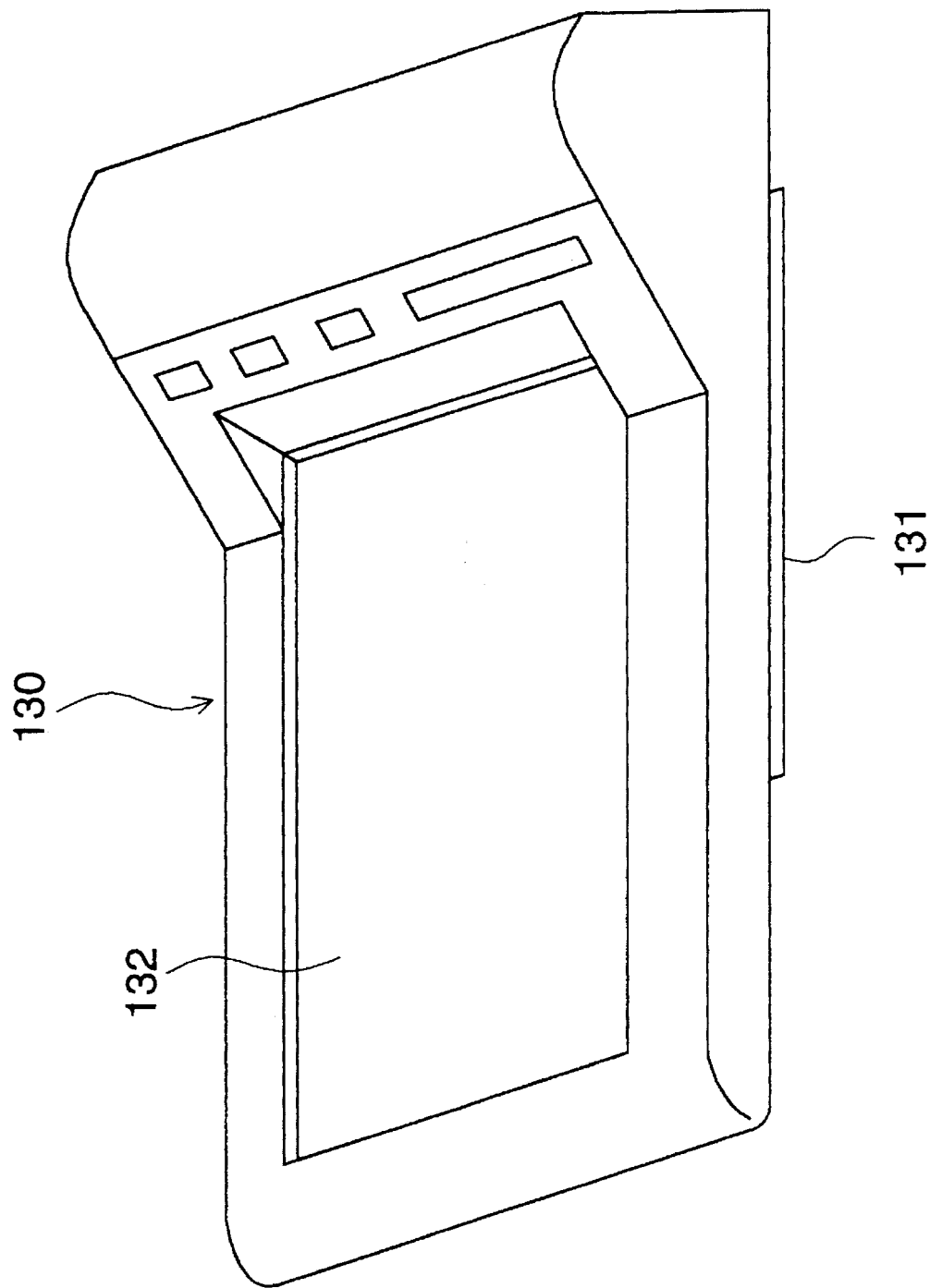
FIG. 25 is a view showing conditions under which information is written on the sheet.

FIGS. 24 and 25 show a condition of use of the facsimile apparatus, in which FIG. 24 is a view showing a condition of an ordinary installation of the facsimile apparatus, and FIG. 25 shows a condition of information writing on the sheet. A collapsible stand 131 is provided at the rear side of the facsimile apparatus 130 as a means for inclining the apparatus on the floor. The facsimile apparatus 130 is placed on the work surface under the condition that the stand 131 is positioned as shown in FIG. 24, and the information is received under the above described condition, then the recording sheet 133 is fed out. When transmitting, the stand 131 is collapsed as shown in FIG. 25, the facsimile apparatus 130 is laid flat, and the information is written on the sheet 132 and transmitted. Due to the foregoing, when the information is written on the sheet 132, the facsimile apparatus is laid flat, except for the above-described condition, a so large work space is not necessary, and the sheet can also be used as a memorandum board.

Figure 26:
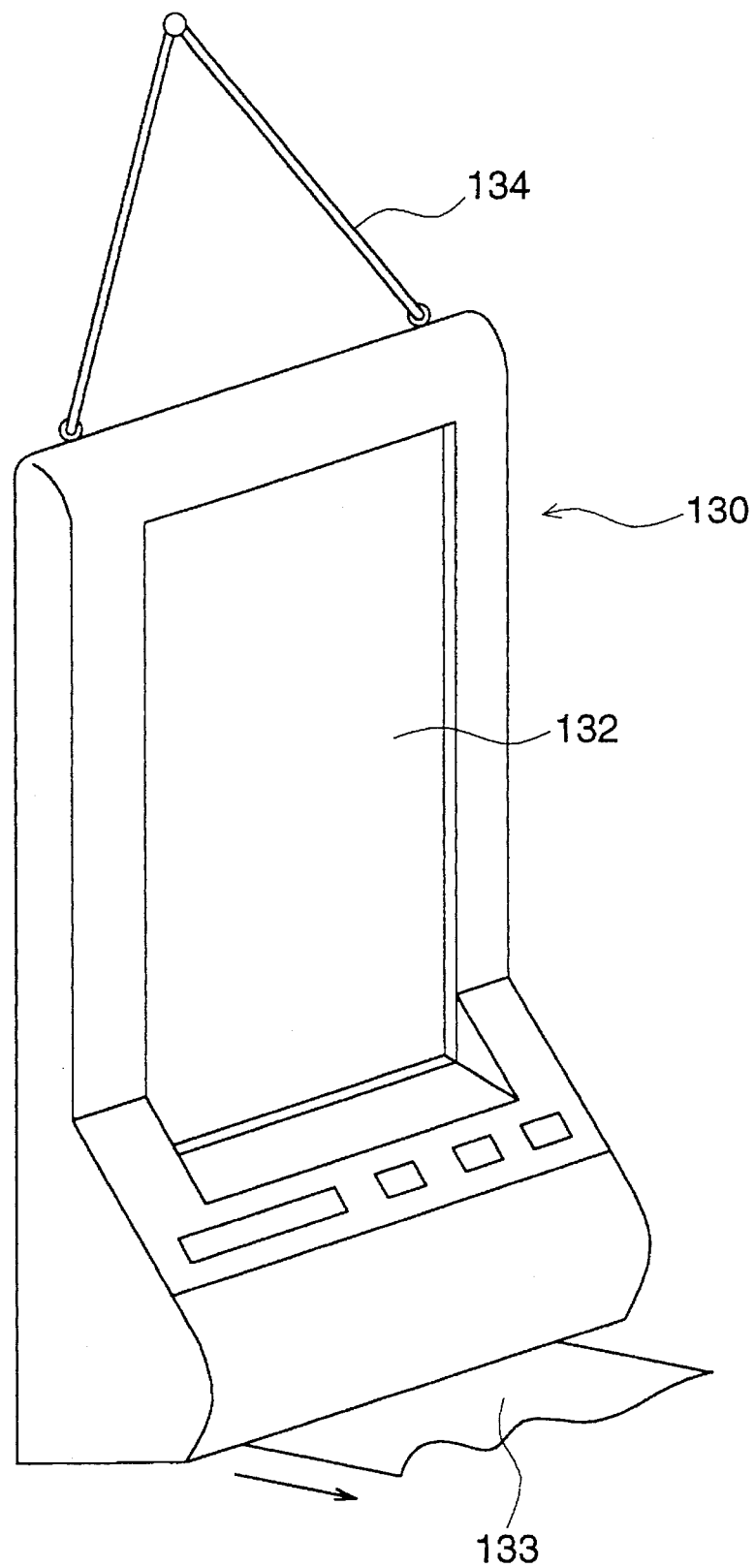
FIG. 26 is a view showing another example of use of the facsimile apparatus.

FIG. 26 is a view showing another use of the facsimile apparatus. A cord 134 for hanging the facsimile apparatus on a wall is provided on the facsimile apparatus 130. Further, a clamp or magnet can be provided on the apparatus for hanging the apparatus on a wall.

Figure 27:
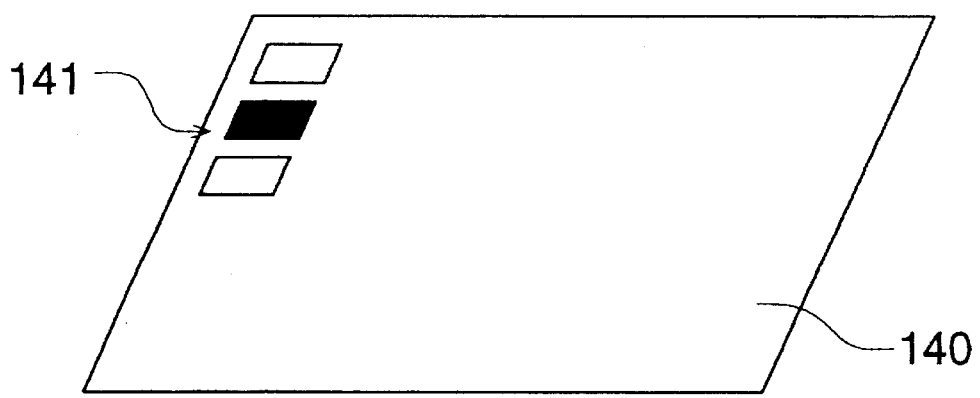
FIG. 27 is a view showing another example of the sheet on which information can be repeatedly written.

FIG. 27 shows another embodiment of the sheet on which information can be repeatedly written. A mark 141 is made on a portion of the sheet 140 on which information can be repeatedly written, and an optical mark reading apparatus for reading the mark 141 is provided in the facsimile apparatus. This facsimile apparatus is not specifically limited. Information necessary for the specific address is written on the sheet 140 in advance, and when the sheet is inserted into the facsimile apparatus, the information is automatically read and transmitted to relatives, police, fire stations, hospitals, or the like.

Referring to the drawing, another embodiment of the facsimile apparatus and the facsimile system according to this invention will be described below.

Figure 28:
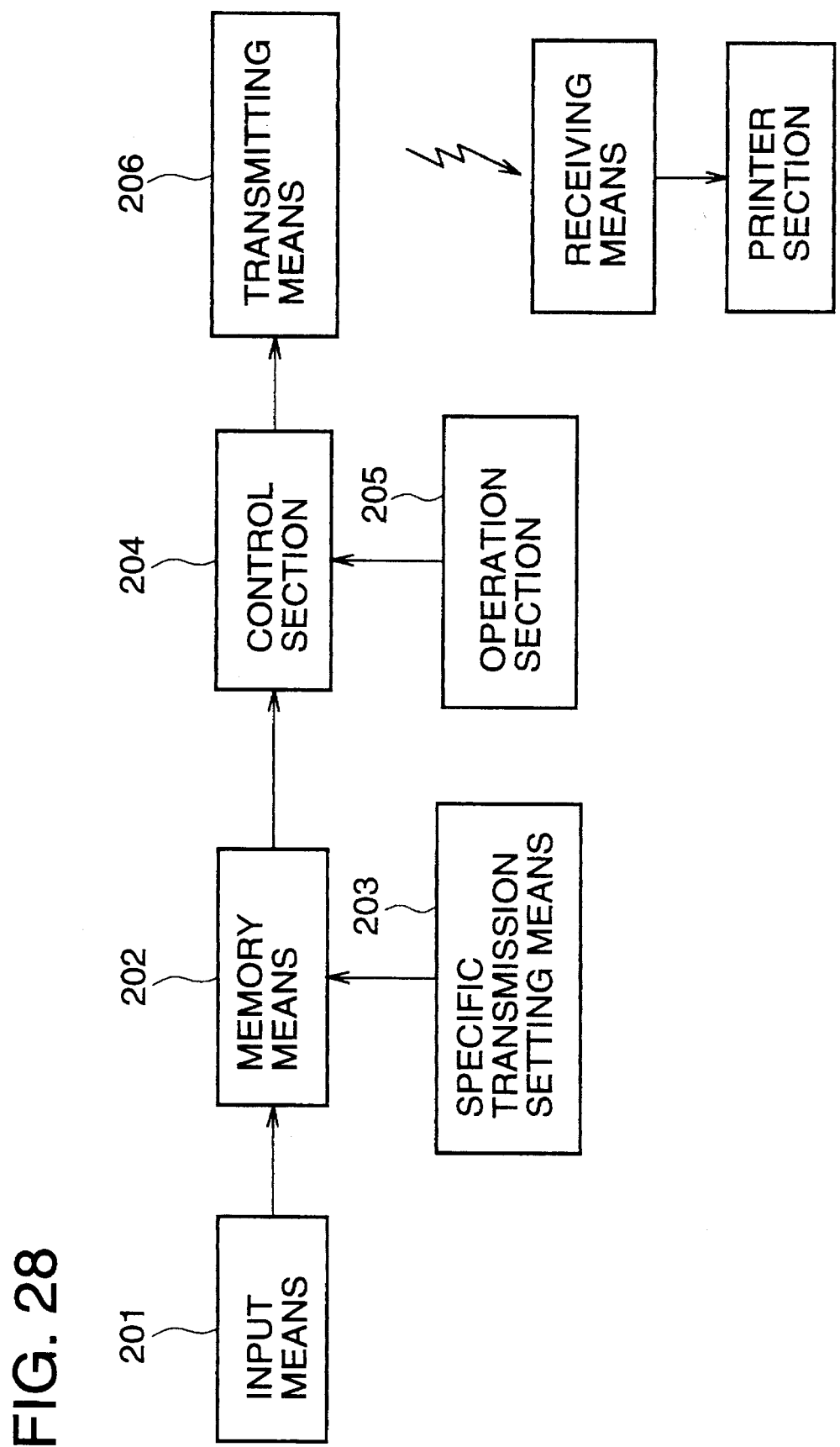
FIG. 28 is a view showing the structure of another facsimile system according to the present invention.

FIG. 28 is a view showing the outline of another embodiment of the facsimile apparatus of this invention. In this facsimile system, a terminal equipment of the transmission side comprises: an input means 201 including a reading means (not shown in the drawings) for obtaining the transmission information from the document, and a ten-key (not shown in the drawings) for inputting the information, such as telephone numbers or the like, of an address to which the transmission information is transmitted (hereinafter, called address designation information); a memory means 202 for storing the transmission information or the address designation information which is inputted by the input means 201; a specific transmission setting means 203 in which specific transmission information in the transmission information is related to specific address designation information corresponding to the specific transmission information, and which stores these information; an operation means 204 for outputting a specific transmission command stored in the memory means 202; and a transmitting means 205 for transmitting the transmission information to an address to be transmitted by a command from the operation means 204.

Here, the specific transmission information is emergency information to be transmitted at the time when the emergency occurs, or the like. For example, the information means: a map showing the location of a fire (the installed position of the terminal equipment) as the fire occurs; a map showing the location of a burglary or robbery (the installed position of the terminal equipment) or an address to make contact with relatives when such cases occur; and information including the family hospital, an address to make contact with relatives, a card showing the blood type and the past history of a patient, and existence of medicinal allergies, when a medical emergency occurs.

This specific transmission information may be transmitted by adding the date and time of the transmission measured by a clock (not shown in the drawings) provided in the terminal equipment of the transmission side other than the transmission information obtained from the document. Here, as the above-described map which shows the installed place of the terminal equipment of the transmission side, code information such as A1-F5 may be used which specifies an area of the map (a code of the map having the designated scale by the fire station, published by the designated publishing house, or a code of the map published by KOKUDO CHIRIIN).

Here, the specific transmission address means an organization to which the above-described specific transmission information is transmitted, and by which processing based on the emergency information is conducted, for example, the local fire station, or police station, a family hospital, a security company, relatives, or the like.

However, the specific transmission information and the specific transmission address are not limited to the foregoing in this invention. That is, when transmission information to be transmitted, and a transmission address to be transmitted, can be determined in advance, these information and address can be called the specific transmission information and a specific transmission address. For example, a supermarket near the user may be selected as a specific transmission address. In this case, the following message may be used as the specific transmission information: "Please deliver 10 Kg of rice to name: ΔΔ, address; ××, ○○" That is, if the information to be transmitted can be determined in advance, and the transmission address of the transmission information can be specified corresponding to the transmission information, the present invention can be performed.

An input means 1 is structured by, for example, a key board, a mouse, a scanner, a hard disk, and a work station in which a disk drive unit is housed. The input means 1 inputs the transmission information or the address designation information into the apparatus. For example, after the document has been set on the platen, and the address designation information (the facsimile number of the transmission address) has been inputted into the apparatus using a ten-key board, when a predetermined operation button is pressed, the document is read out by a scanner as the transmission information, and inputted into the terminal equipment of the transmission side together with the address designation information. Then, the inputted transmission information is transmitted to the transmission address according to the address designation information by the transmitting means.

In this specification, mainly, an example in which the document information is used as the transmission information, and an example in which the ten-key board is used as an inputting method of the transmission address, are described, however the present invention is not limited to these examples. For example, the system may be structured as follows: a recording medium such as a floppy disk, an optical disk, or an IC card may be used in which a map, in which a portion corresponding to an installed place of the terminal equipment of the transmission side is marked, or the address designation information is stored; and the information stored in the recording medium is inputted into the apparatus. When this recording medium is used, much time and labor can be saved when the user presses the ten-key board by himself, so that a large amount of information can be simply and quickly inputted.

The specific transmission setting means 203 stores the specific transmission information and the address designation information in the memory means, wherein these two kinds of information correspond to each other. As an example, the transmission information and the address designation information inputted from the input means 1 after a predetermined operation button has been pressed are stored as the specific transmission information and the specific address designation information. That is, the specific address setting means 203 stores specific information in the information inputted from the input means 1.

However, this specific transmission setting means 203 is not limited to the foregoing, and the specific transmission setting means 203 may be structured as follows: the specific transmission setting means 203 has an independent reading means, and stores the information read out by the reading means as the specific transmission information and the specific address designation information.

Further, it is preferable that the specific transmission setting means 203 has a self-diagnosing function which checks the specific designation information and the corresponding specific address designation information which have been set by a conventionally-known method, for every predetermined period. For example, information different from the specific transmission information is transmitted for checking to the specific transmission address for every predetermined period, the change of the number of the other facsimile is checked, and the existence of problems of the terminal equipment of the receiver side is checked.

Further, it is preferable that the specific transmission setting means 203 detects the change of the address designation information when the specific address designation information is changed after the specific address designation information has been stored once by the conventionally-known method, (for example, when the telephone number of the police station is changed); and the specific transmission setting means automatically switches the changed address designation information to the new address designation information In this case, time and labor necessary for the input of the correct information can be greatly reduced, and information processing becomes simpler.

The operation means 205 is used for outputting a transmission command for starting the transmission according to the specific transmission information and the corresponding specific address designation information which are stored in the memory means 202, by the transmitting means 206. When an emergency occurs, the transmitting means 206 is operated simply by pressing the operation means 205, the terminal equipment of the receiver side is contacted, and the transmission of the specific transmission information is started. It is preferable that the transmission address button of the operation means 205 is marked by a symbol such as a mark of the police station so that the transmission address can be more easily recognized, when the use of the operation means 205 is considered.

As described above, in the facsimile system of the present invention, the transmission information and the transmission address (designation information) are inputted in advance by the inputting means 201; and the transmission information set by the specific transmission setting means 203, and the corresponding address designation information are respectively stored in the memory means as the specific transmission information and the specific address designation information. For example, when an abnormal condition or an emergency occurs, the specific transmission command is outputted only by the operation of the operation means 205; and the transmitting means 206 transmits the corresponding specific transmission information according to the specific address designation information stored in the memory means 202.

Figure 29:
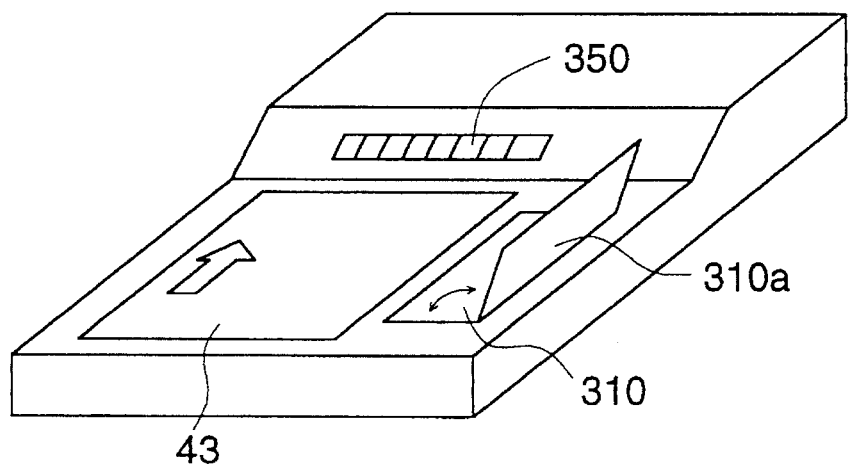
FIG. 29 is a perspective view showing an example of a facsimile apparatus into which additional information can be inputted.
Figure 30:
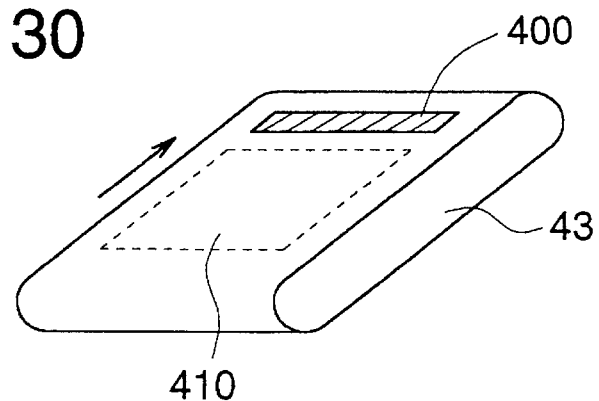
FIG. 30 is a view showing an additional information area of an endless-belt.
Figure 31:
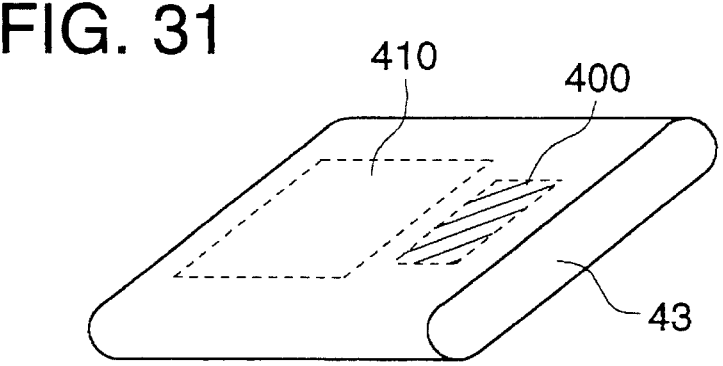
FIG. 31 is a view showing an additional information area of the endless-belt.

FIGS. 29 through 31 show another example of the facsimile apparatus. In this example also, information is written using the endless-belt. However, this example is characterized in that: an additional information area 400 is provided in which additional information such as the transmission address number or the number of copied sheets is written on a portion other than an ordinary writing area 410, and commanded thereby.

In this example, as shown in FIG. 29, an input apparatus 310, using a part of the sheet 43 on which information can be repeatedly written, is provided beside the ordinary writing surface, and the additional information is inputted into the input apparatus 310. In this example, a cover portion 310a of the input apparatus 310 is opened, and the additional information is inputted by a multiple-choice method according to a mark-sheet method. The inputted information is read into the apparatus by an OMR (Optical Mark Reader) method as the information which can be electrically processed. Here, the following can also be carried out: characters are written in rows, and those can be read out by an OCR (Optical Character Reader) method, without using the multiple-choice method.

Even if any method is used, since the writing film, which can be repeatedly used, is used for the input of additional information in this embodiment, the input operation can be carried out at lower cost and more simply than the conventional method in which the information is inputted using the exclusive mark-sheet.

The additional information is written by an operator in the additional information area provided on the endless-belt 43.

Concerning this writing position, at least, the following two kinds of methods can be considered. In the embodiment shown in FIG. 30, the additional information area 400 is provided at either of the front or rear portion in the movement direction of the endless-belt 43 with respect to the writing area 410. Alternatively, in the embodiment shown in FIG. 31, the additional information area 400 is provided at either of the left or right side in the movement direction of the endless-belt 43 with respect to the writing area 410.

Further, in the case where the inputted additional information is not deleted although the document has already been transmitted, the written massage is repeatedly transmitted to the same transmission address. Accordingly, this embodiment is structured as follows: when the facsimile number of the transmission address is directly inputted and transmitted using the input apparatus 350 of the facsimile number of the transmission address, the information inputted by the input apparatus 310 for the additional information is cancelled, and transmission errors can be prevented.

Figure 33:
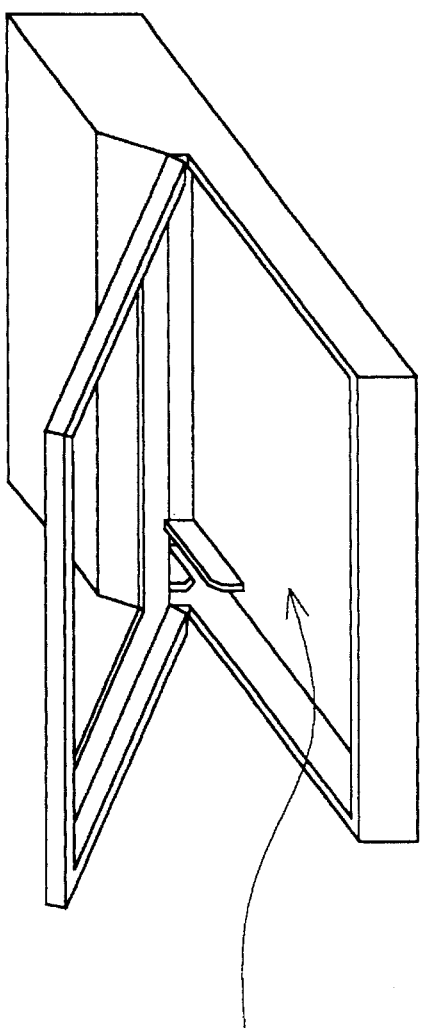
FIG. 33 is a perspective view of a main body in an example of the facsimile apparatus in which a writing section is formed into a unit.
Figure 32:
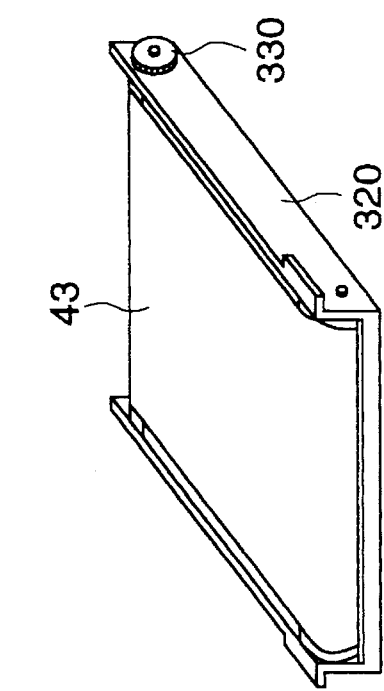
FIG. 32 is a perspective view of a unit section in an example of the facsimile apparatus in which a writing section is formed into a unit.
Figure 34:
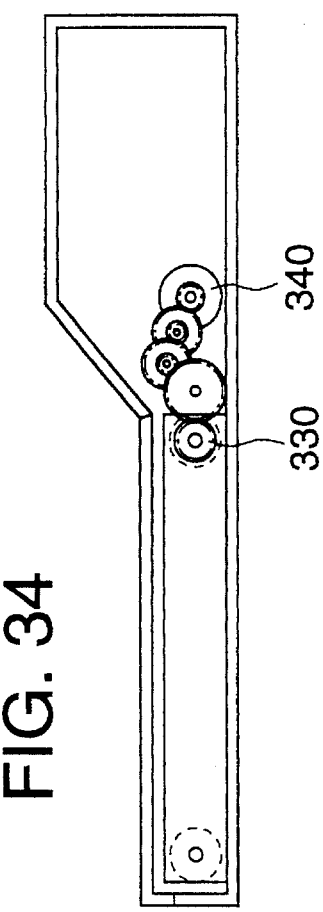
FIG. 34 is a sectional view showing an example of the facsimile apparatus in which a writing section is formed into a unit.

FIGS. 32 through 34 show another embodiment of the facsimile apparatus. In this embodiment, although the writing is carried out using also the endless-belt 43 as shown in other embodiments, the endless-belt is formed together with a supporting frame 320 into a unit, and the unit can be detached from the main body shown in FIG. 33. Due to the foregoing, cleaning of the endless-belt is more easily carried out, and unjamming can be easily done when the document conveyed on the endless-belt is jammed. FIG. 32 shows the endless-belt which is formed into a unit. In the drawing, numeral 320 is a supporting frame for supporting the endless-belt, and numeral 330 is a drive gear for interlocking a drive source for driving the endless-belt, with the winding shaft around which the endless-belt is wound.

As shown in FIG. 34, in a condition that the endless-belt is integral to the main body, the driving motor 340 is connected with the drive gear 330 through appropriate intermediate gears.

Figure 35:
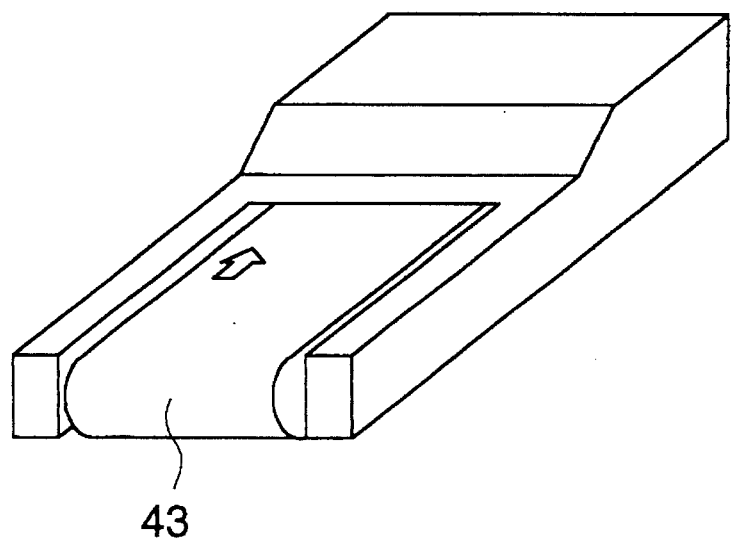
FIG. 35 is a perspective view showing an example of the facsimile apparatus in which the writing section is exposed.

FIG. 35 shows another embodiment in which cleaning of the endless-belt and unjamming of the document can be more easily carried out, in the same manner as that of embodiments shown in FIGS. 32 through 34. In the embodiment shown in FIG. 35, the detachable unit, as described in the embodiments shown in FIGS. 32 through 34, is not provided, but only a portion of the main body case is removed and a portion of the endless-belt is exposed as large as possible, and thereby, the same effect as in the case where the detachable unit is provided, can be obtained.

Figure 36:
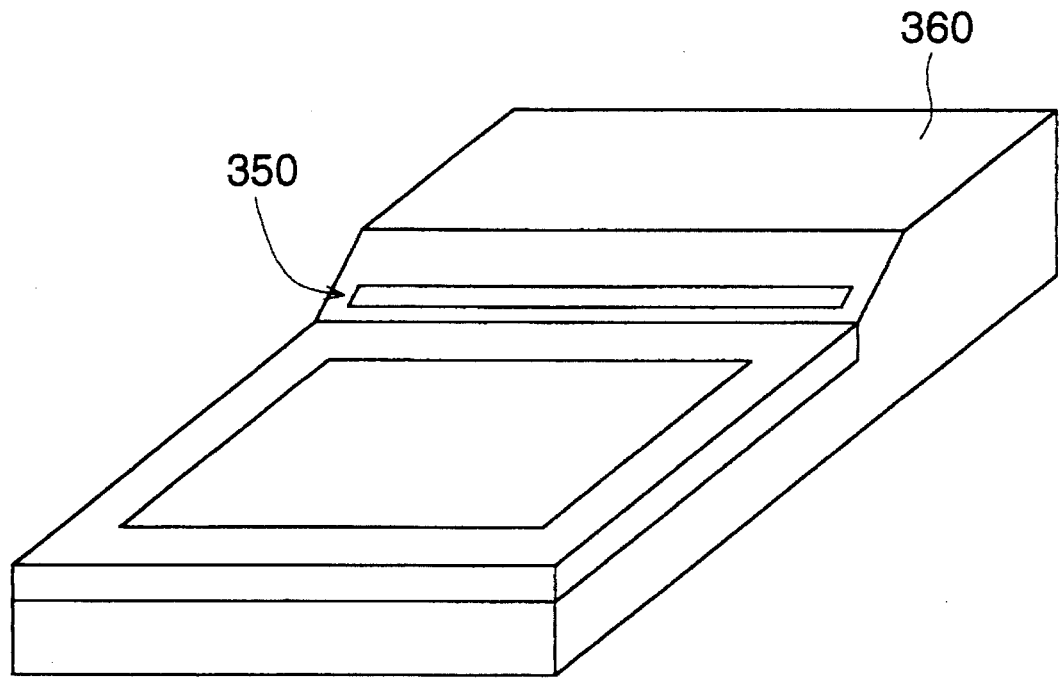
FIG. 36 is a perspective view showing an example in which an outlet for recording sheets is provided on the front of the main body.

The foregoing embodiments are structured as follows: the received image document is recorded on the recording sheet loaded in the main body, and is delivered from the rear surface of the main body. However, in any embodiment, as shown in FIG. 36, a delivery opening 350 can also be provided at an upper portion of the input window on the front surface of the main body. In this case, even when a telephone receiver is placed on the telephone placement surface 360, the recording sheet is delivered. Accordingly, it is not necessary to reach the hand to the rear surface of the main body in order to take out the recording sheet, and the recording sheet can be easily taken out. Further, even when the delivery opening is provided at the position shown in the drawing, it is not necessary to increase the size of the main body, and the apparatus can be designed more compactly.

Therefore, according to the embodiments of the present invention, since the apparatus is provided with a repeatedly usable writing portion, a facsimile transmitting operation can be carried out without using the document sheet, so that the apparatus is more ecologically suitable, and is also more economical.

What is claimed is:

1. A facsimile apparatus for transmitting an image, the apparatus comprising:

(a) an image holding member having an endless belt-shape, for holding said image on a surface thereof;

(b) a writing frame device for exposing a predetermined writing frame portion of said image holding member to an outside of said facsimile apparatus;

(c) a reading device in contact with said image holding member for reading said image on said predetermined writing frame portion of said image holding member and for generating image signals corresponding to said image, wherein said reading device being located in an inside portion of said image holding member whereby said reading device reads said image from a backside of said holding member; and (d) a transmitter for transmitting said image signals to a predetermined transmission address.

2. The facsimile apparatus of claim 1 further comprising:

(a) a supporting frame member for supporting said image holding member, said supporting frame member and said image holding member comprising a unit,
wherein said supporting frame member is detachable from said facsimile apparatus;

(b) a unit receiving member for receiving said supporting frame member for coupling with said facsimile apparatus;

(c) a conveying member for conveying said image holding member a distance, said distance corresponding to a size of said writing frame device,
wherein, when said unit receiving member receives said supporting frame member, said conveying member is connected with said image holding member.

3. The facsimile apparatus of claim 1, further comprising:

a receiving device for receiving information signals from another facsimile apparatus.

4. A facsimile apparatus for transmitting an image, said apparatus comprising:

(a) an image holding member having an endless belt-shape for holding said image on a surface thereof, said image holding member including:
(1) a document supporting sheet for supporting a document on said surface and
(2) a transparent sheet for covering said document to hold said document between said document supporting sheet and said transparent sheet;

(b) a writing frame member for exposing a predetermined writing frame portion of said image holding member to an outside of said facsimile apparatus;

(c) a conveying device for conveying said image holding member for a predetermined distance, said distance being a minimum distance corresponding to a size of said writing frame member;

(d) a reading device in contact with said image holding member for reading said image on said predetermined writing frame portion of said image holding member and for generating image signals corresponding to said image,
wherein said reading device is located in an inside portion of said image holding member whereby said reading device reads said image from a backside of said image holding member; and (e) a transmitting device for transmitting said image signals to a predetermined transmission address.

5. The facsimile apparatus of claim 4 further comprising a receiving device for receiving information signals from another facsimile apparatus.

6. A facsimile apparatus for transmitting an image, said apparatus comprising:

(a) an image holding member comprising a transparent member having an endless belt-shape for holding said image on a surface thereof;

(b) a writing frame member for exposing a predetermined writing frame portion of said image holding member to an outside of said facsimile apparatus;

(c) a conveying device for conveying said image holding member a distance, said distance corresponding to a size of said writing frame member;

(d) a reading device in contact with said image holding member for reading said image on said predetermined writing frame portion of said image holding member and for generating image signals corresponding to said image, wherein said reading device is located in an inside portion of said image holding member whereby said reading device reads said image from a backside of the transparent holding member; and (e) a transmitting device for transmitting said image signals to a predetermined transmission address.

7. The facsimile apparatus of claim 6, wherein said reading device reads said image while said reading device is in contact with an inside surface of said image holding member.

8. The facsimile apparatus of claim 6, further comprising an image processing device for reversing orientation of said image signals in a left-right direction corresponding to said image to obtain corrected image signals corresponding to said image.

* * * * *